US012228353B2

(12) United States Patent
Yu et al.

(10) Patent No.: US 12,228,353 B2
(45) Date of Patent: Feb. 18, 2025

(54) NEAR-FIELD RADIATIVE HEAT TRANSFER SYSTEMS AND METHODS OF USE THEREOF

(71) Applicant: Toyota Motor Engineering & Manufacturing North America, Inc., Plano, TX (US)

(72) Inventors: Ziqi Yu, Ann Arbor, MI (US); Xiaopeng Li, Ann Arbor, MI (US); Taehwa Lee, Ann Arbor, MI (US); Hideo Iizuka, Nagakute (JP)

(73) Assignees: Toyota Motor Engineering & Manufacturing North America, Inc., Plano, TX (US); Toyota Jidosha Kabushiki Kaisha, Totota (JP)

( * ) Notice: Subject to any disclaimer, the term of this patent is extended or adjusted under 35 U.S.C. 154(b) by 203 days.

(21) Appl. No.: 18/104,607

(22) Filed: Feb. 1, 2023

(65) Prior Publication Data
US 2023/0280114 A1 Sep. 7, 2023

Related U.S. Application Data

(60) Provisional application No. 63/330,085, filed on Apr. 12, 2022, provisional application No. 63/315,180, filed on Mar. 1, 2022.

(51) Int. Cl.
*F28F 13/00* (2006.01)
*B82Y 20/00* (2011.01)
(Continued)

(52) U.S. Cl.
CPC ............... *F28F 5/00* (2013.01); *B82Y 20/00* (2013.01); *B82Y 30/00* (2013.01); *F25B 23/003* (2013.01);
(Continued)

(58) Field of Classification Search
CPC ...... F28F 13/00; F28F 2013/008; F28F 13/18; B82Y 20/00; F25B 23/003; G02F 1/009
See application file for complete search history.

(56) References Cited

U.S. PATENT DOCUMENTS 5,838,065 A 11/1998 Hamburgen et al.
7,219,713 B2 5/2007 Gelorme et al.
(Continued)

FOREIGN PATENT DOCUMENTS

CN 111609750 A * 9/2020
WO 2014032684 A1 3/2014
WO 2014148585 A1 9/2014

OTHER PUBLICATIONS

Yang et al., "Twist-induced control of near-field heat radiation between magnetic Weyl semimetals", ACS Photonics 8.2 (2021): 443-448.
(Continued)

*Primary Examiner* — Eric S Ruppert
(74) *Attorney, Agent, or Firm* — Dinsmore & Shohl LLP

(57) ABSTRACT

Embodiments described herein relate a tunable heat transfer system. The tunable heat transfer system includes a controller, a first body, and a second body. The first body is communicatively coupled to the controller. The second body is communicatively coupled to the controller and spaced apart from the first body. The second body has a plurality of semimetal layers and a dielectric portion positioned between each of the plurality of semimetal layers. Each of the dielectric portions has a thickness to define a gap between each the plurality of semimetal layers in an expanded state and permitting each of the plurality of semimetal layers to abut each other in a contracted state. The controller is configured to change a near-field radiative heat transfer between the first body and the second body by changing the
(Continued)

thickness of each of the dielectric portions between the expanded state and the contracted state.

20 Claims, 15 Drawing Sheets

(51) Int. Cl.
   *B82Y 30/00* (2011.01)
   *F25B 23/00* (2006.01)
   *F28F 5/00* (2006.01)
   *F28F 27/00* (2006.01)
   *G02B 1/00* (2006.01)

(52) U.S. Cl.
   CPC .............. *F28F 13/00* (2013.01); *F28F 27/00* (2013.01); *G02B 1/002* (2013.01); *F28F 2013/001* (2013.01); *F28F 2013/008* (2013.01); *F28F 2255/20* (2013.01)

(56) References Cited

U.S. PATENT DOCUMENTS

| | | | |
|---|---|---|---|
| 9,080,820 B2 | 7/2015 | Bolton | |
| 10,256,391 B2 | 4/2019 | Gooth et al. | |
| 11,011,692 B2 | 5/2021 | Heremans et al. | |
| 11,204,206 B2 | 12/2021 | Busche | |
| 2004/0098991 A1 | 5/2004 | Heyes | |
| 2019/0027615 A1* | 1/2019 | Zheng | H10N 10/81 |
| 2020/0348055 A1 | 11/2020 | Pereira et al. | |

OTHER PUBLICATIONS

Kan et al., "Near-field radiative heat transfer in three-body systems with periodic structures", Physical Review B 99.3 (2019): 035433.

He, et al., "Active control of near-field radiative heat transfer by a graphene-gratings coating-twisting method", Optics letters 45.10 (2020): 2914-2917.

Kan et al., "Near field radiative heat transfer in asymmetric three-grating systems", International Journal of Heat and Mass Transfer 171 (2021): 121124.

Yang et al., "Twist-induced control of near-field thermal radiation in multilayered black phosphorus/vacuum system" International Journal of Thermal Sciences 170 (2021): 107142.

Iizuka et al., "Control of non-equilibrium Casimir force." Applied Physics Letters 118.14 (2021): 144001.

Iizuka et al., "Significant Enhancement of Near-Field Electromagnetic Heat Transfer in a Multilayer Structure through Multiple Surface-States Coupling", Physical review letters 120.6 (2018): 063901.

* cited by examiner

NEAR-FIELD RADIATIVE HEAT TRANSFER SYSTEMS AND METHODS OF USE THEREOF

CROSS-REFERENCE TO RELATED APPLICATIONS

This utility patent application claims priority from U.S. Provisional Patent Application Ser. No. 63/315,180 filed Mar. 1, 2022, and entitled "Near-Field Radiative Heat Transfer in Multilayer Weyl Semimetals" and U.S. Provisional Patent Application Ser. No. 63/330,085 filed Apr. 12, 2022, and entitled "Near-Field Radiative Heat Transfer in Three-Body Weyl Semimetals", the contents of each are included herein by reference.

TECHNICAL FIELD

The present specification generally relates to radiative cooling, and more particularly, to near-field radiative heat transfer.

BACKGROUND

Passive radiative cooling is known for improving energy efficiencies by providing a path to dissipate heat from a structure into an atmosphere. Further, it is known to use radiative cooling via pigmented paints, dielectric coating layers, metallized polymer films, and organic gases because of their intrinsic thermal emission properties. Additionally, known thermal switch devices may be designed by placing two parallel Weyl semimetal planar objects distancing a nanoscale gap and rotating one object with respect to the other. As the rotation angle increases, the amount of heat transfer will decrease. However, only rotation is used as a control for conventional thermal switches.

SUMMARY

In one embodiment, a tunable heat transfer system is provided. The tunable heat transfer system includes a controller, a first body, and a second body. The first body is communicatively coupled to the controller. The second body is communicatively coupled to the controller and spaced apart from the first body. The second body has a plurality of semimetal layers and a dielectric portion positioned between each of the plurality of semimetal layers. Each of the dielectric portions has a thickness to define a gap between each the plurality of semimetal layers in an expanded state and permitting each of the plurality of semimetal layers to abut each other in a contracted state. The controller is configured to change a near-field radiative heat transfer between the first body and the second body by changing the thickness of each of the dielectric portions between the expanded state and the contracted state.

In another embodiment, a thermal cooling system is provided. The thermal cooling system includes a controller, a first body, and a second body. The first body is communicatively coupled to the controller. The first body has a first plurality of semimetal layers and a first dielectric portion positioned between each of the first plurality of semimetal layers. Each of the first dielectric portions have a thickness to define a first gap between each of the first plurality of semimetal layers. The second body is spaced apart from the first body. The second body is communicatively coupled to the controller. The second body has a second plurality of semimetal layers and a second dielectric portion positioned between each of the second plurality of semimetal layers. Each of the second dielectric portions has a thickness to define a second gap between each of the second plurality of semimetal layers in an expanded state and permitting each of the second plurality of semimetal layers to abut each other in a contracted state. The controller is configured to change a near-field radiative heat transfer between the first body and the second body by changing the thickness of each of the second dielectric portions between the expanded state and the contracted state.

In yet another embodiment, a method for forming a tunable heat transfer system is provided. The method includes applying a control signal to a body via a controller, to move a plurality of semimetal layers of the body to change a thickness of a dielectric portion positioned between each of the plurality of semimetal layers to move between a contracted state and an expanded state and rotating the body, wherein the rotation of the body changes optical properties of the body compared to an unrotated object. The moving of the dielectric portions of the body between the contracted state and the expanded state move the plurality of semimetal layers to change a near-field radiative heat transfer by changing the thickness of the dielectric portions positioned between each of the plurality of semimetal layers thereby changing gaps between the plurality of semimetal layers.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to a tunable system that includes a pair of multilayered bodies made that has nanoscale Weyl semimetal layers gapped by a dielectric. The dielectric may be a vacuum. Each of the multilayer bodies may be decorated on a semi-infinite Weyl semimetal substrate. A second body of the pair of multilayered bodies may be tuned by rotation. Further, both of the pair of bodies (a first body and the second body) may change the gap size simultaneously and independently and while the second body is rotated. Each of the multilayer bodies may couple more surface plasmonic modes to change the near-field radiative heat transfer. When a thermal switch undergoes over a transition from the initial state where the gap size between layers are non-zero to the final state where the gap size between the layers reduces to 0, the thermal switch ratio can reach over 90.6%, which is much higher than the conventional switches.

The rotation and/or changing of the thickness of the second body changes an optical property of a second plurality of Weyl semimetal nanostructures to create a mismatch in a permittivity of the optical properties of the second body compared to the optical properties of the first body. The rotation and/or changing of the thickness of the second body increases or decreases a near-field radiative heat transfer compared to a static state of the first body.

Various embodiments of optical metamaterials system to tune radiative cooling are described in detail herein.

As used herein, the term "communicatively coupled" means that coupled components are capable of exchanging data signals and/or electric signals with one another such as, for example, electrical signals via conductive medium, electromagnetic signals via air, optical signals via optical waveguides electrical energy via conductive medium or a non-conductive medium, data signals wirelessly and/or via conductive medium or a non-conductive medium and the like.

Figure 1:
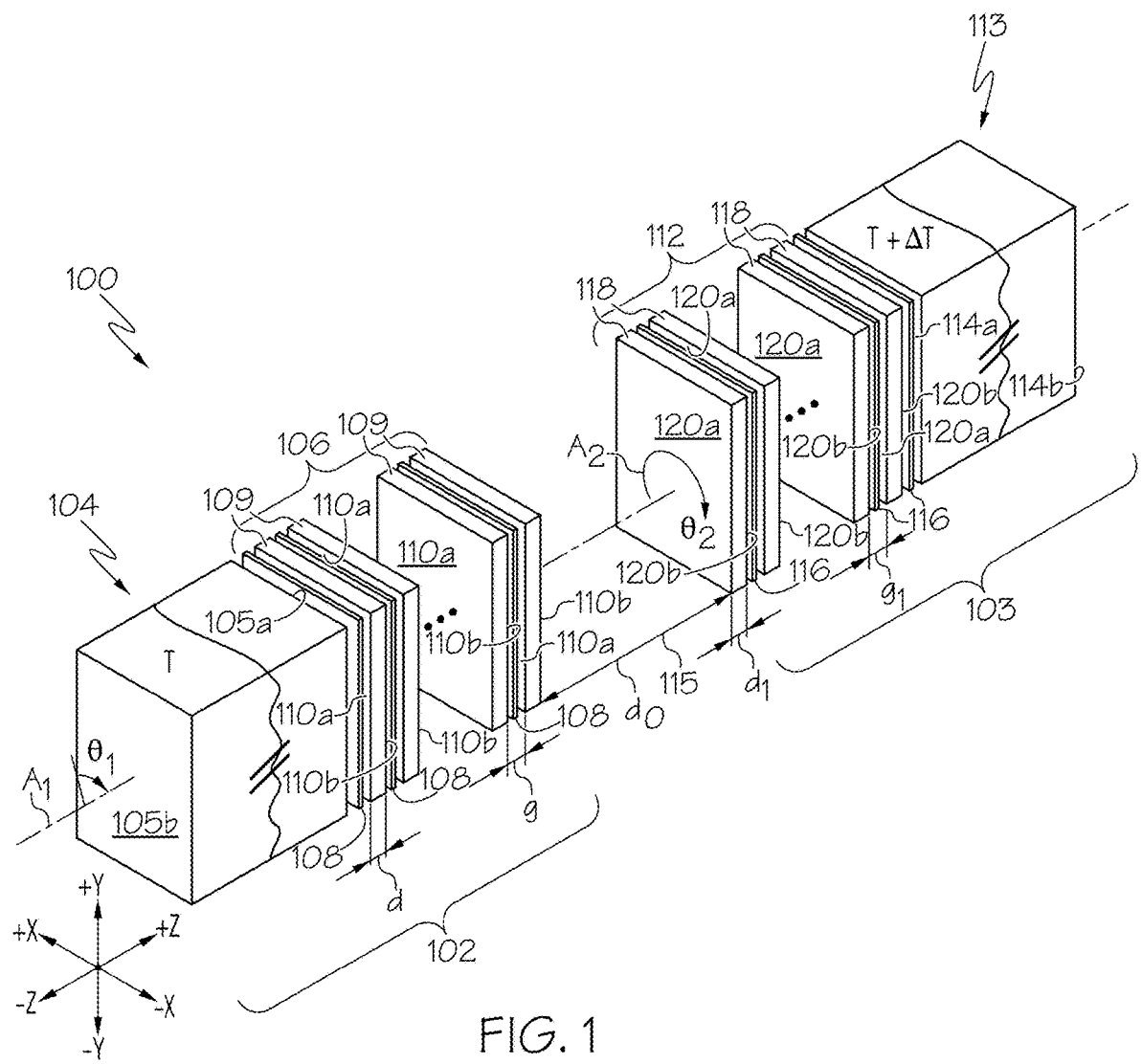
FIG. 1 schematically depicts a perspective view of an example multilayer thermal tunable system according to one or more embodiments shown and described herein.

Further, as used herein, the term "system lateral direction" refers to the forward-rearward direction of the system (i.e., in a +/−X direction of the coordinate axes depicted in FIG. 1). The term "system longitudinal direction" refers to the cross-direction (i.e., along the Z-axis of the coordinate axes depicted in FIG. 1 in the longitudinal direction), and is transverse to the lateral direction. The term "system vertical direction" refers to the upward-downward direction of the system (i.e., in the +/−Y direction of the coordinate axes depicted in FIG. 1).

Referring now to FIG. 1, an example multilayer thermal tunable system 100 is schematically illustrated. In some embodiments, the example multilayer thermal tunable system 100 may be a two-body thermal transference system that includes a first body 102 and a second body 103 spaced apart from the first body 102. In other embodiments, the example multilayer thermal tunable system 100 may be a three-body system or more. In some embodiments, the first body 102 and the second body 103 may be positioned in a linear arrangement along a same axis such as illustrated in the system vertical direction (i.e., in the +/−Y direction). In other embodiments, the first body 102 and the second body 103 may be in an asymmetric arrangement or not arranged to be aligned along the same axis, for example, arranged along the longitudinal direction (i.e., in the +/−Z direction), the lateral direction (i.e., in the +/−X direction), and/or combinations of the vertical direction, lateral direction and/or longitudinal direction.

The first body 102 includes a semi-infinite substrate 104 or plate and N multilayers 106. The semi-infinite substrate 104 includes an inner surface 105a and an opposite outer surface 105b to define a thickness. Both the N multilayers 106 and the semi-infinite substrate 104 are each made of Weyl semimetal and are illustrated as separated by a dielectric 108. As used herein, a dielectric may be a medium or substance that transmits electromagnetic waves without conduction and as such, may be an insulator. Example dielectrics may be a solid dielectric such as a ceramic, plastic, mica, glass, and/or the like, a liquid such as a distilled water and the like, and/or a gas such as dry air, vacuum, nitrogen, helium, and the like. As such, in some embodiments, the dielectric 108 may be vacuum gaps.

Figure 2A:
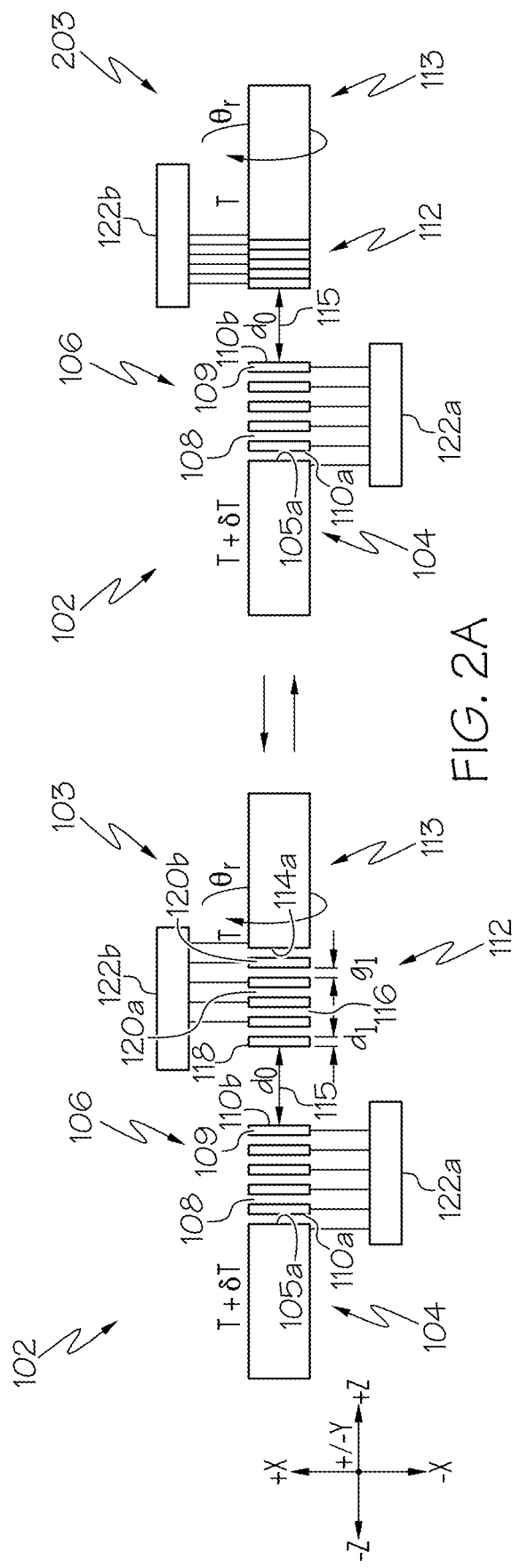
FIG. 2A schematically depicts a side view of the example multilayer thermal tunable system of FIG. 1 further illustrating a first body with a plurality of spaced apart Weyl semimetal multilayers thereof remaining unchanged and a second body with a plurality of Weyl semimetal multilayers thereof controlled to change the gaps between the layers according to one or more embodiments shown and described herein.
Figure 2B:
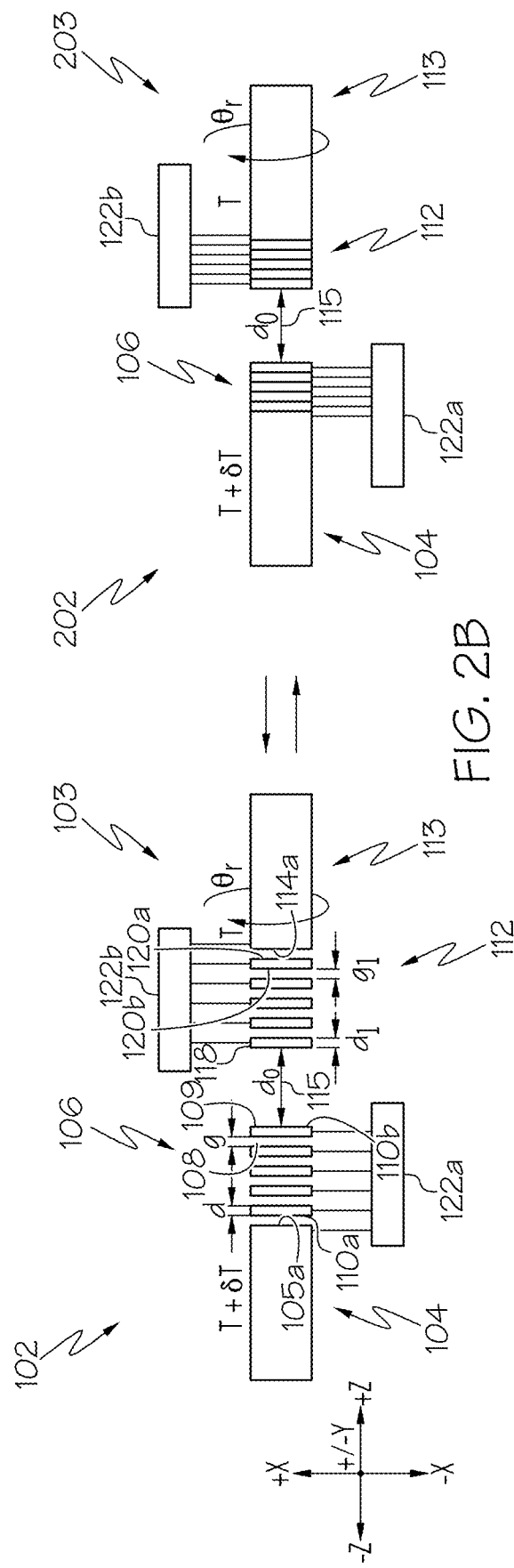
FIG. 2B schematically depicts a side view of the example multilayer thermal tunable system of FIG. 2A further illustrating the plurality of spaced apart Weyl semimetal multilayers of the first body controlled to change the gaps between the layers and the plurality of spaced apart Weyl semimetal multilayers of the second body controlled to change the gaps between the layers according to one or more embodiments shown and described herein.

It should be appreciated that both the N multilayers 106 and the semi-infinite substrate 104 may be decorated as a semi-infinite Weyl semimetal when in an uncontracted state, or expanded state (e.g., the first body 102), as illustrated in FIG. 2A. Further, the N multilayers 106 of the first body 102 are each configured to move between and into the contracted state in which a semi-infinite Weyl semimetal body without any multilayer decoration 202 is formed, as best shown in FIG. 2B and discussed in greater detail herein.

As used herein, "Weyl semimetal" may be three-dimensional topological materials that are nanoscaled, where valence band and conduction band touch at finite specific points in momentum space. The Weyl semimetal may be any shape including, for example, bicone shaped, dicone shaped, cone shaped, frustoconical shaped, cylindrical shaped, tetragonal shaped, hexagonal shaped, and/or the like.

Each layer 109 of the N multilayers 106 has a first surface 110a and an opposite second surface 110b to define a thickness d. In some embodiments, the first surface 110a of layer 109 of the N multilayers 106 that is adjacent to the semi-infinite substrate 104 faces the inner surface 105a of the semi-infinite substrate 104. In some embodiments, each layer 109 of the N multilayers 106 may have the same thickness d. In other embodiments, each layer 109 or combination of layers of the N multilayers 106 have varying or different thicknesses d in an uncontracted state, or expanded state, as best illustrated in FIG. 2A, and as discussed in greater detail herein.

In some embodiments, the dielectric 108 between each successive first surface 110a and second surface 110b of the adjacent layers 109 of the N multilayers 106 has the same spacing of g. In other embodiments, the spacing g of the dielectric 108 positioned between each successive first surface 110a and second surface 110b of the adjacent layers 109 of the N multilayers 106 has a varying spacing g and/or combinations of varying spacing g.

The N multilayers 106 are illustrated as being orientated along the vertical direction (i.e., the +/−Y direction). This is non-limiting, the N multilayers 106 may be orientated along the lateral direction (i.e., the +/−Y direction), the longitudinal direction (i.e., in the +/−Z direction) and/or combinations of the vertical, lateral, and longitudinal directions. The first body 102 is spaced part or separated from the second body 103 by a central gap 115 ($d_0$).

The second body 103 includes N multilayers 112 and a semi-infinite substrate 113 or plate. The semi-infinite substrate 113 includes an inner surface 114a and an opposite outer surface 114b to define a thickness. Both the N multilayers 112 and the semi-infinite substrate 113 are each made of Weyl semimetal and are illustrated as separated by a dielectric 116. It should be appreciated that both the N multilayers 112 and the semi-infinite substrate 113 may be decorated as a semi-infinite Weyl semimetal when in an uncontracted state, or expanded state (e.g., the second body 103), as illustrated in FIG. 2A. Further, the N multilayers 112 of the second body 103 are each configured to move between and into the contracted state in which a semi-infinite Weyl semimetal body without any multilayer decoration 203 is formed, as best shown in FIG. 2B and discussed in greater detail herein. In some embodiments, the dielectric 108 may be vacuum gaps. In some embodiments, the dielectric 116 may be vacuum gaps.

Each layer 118 of the N multilayers 112 has a first surface 120a and an opposite second surface 120b to define a thickness $d_1$. In some embodiments, the first surface 120a of layer 118 of the N multilayers 112 that is adjacent to the semi-infinite substrate 113 faces the inner surface 114a of the semi-infinite substrate 113. In some embodiments, each layer 118 of the N multilayers 112 may have the same thickness $d_1$. In other embodiments, each layer 118 or combination of layers of the N multilayers 112 have varying or different thicknesses $d_1$ in an uncontacted state, or expanded state, as best illustrated on the left side, or starting position, in FIG. 2A, and as discussed in greater detail herein.

In some embodiments, the dielectric 116 between each successive first surface 120a and second surface 120b of the adjacent layers 118 of the N multilayers 112 has the same spacing of $g_1$. In other embodiments, the spacing $g_1$ of the dielectric 116 positioned between each successive first surface 120a and second surface 120b of the adjacent layers 118 of the N multilayers 112 has a varying spacing $g_1$ and/or combinations of varying spacing $g_1$.

The N multilayers 112 are illustrated as being stacked along the longitudinal direction (i.e., the +/−Z direction). This is non-limiting, the N multilayers 112 may be stacked along the vertical direction (i.e., the +/−X direction), the vertical direction (i.e., in the +/−Y direction) and/or combinations of the vertical, lateral, and longitudinal directions.

The first body 102 is in a fixed position and the second body 103 is configured to rotate with respect to the first body 102. As such, the heat transfer between the first body 102 and the second body 103 may be controlled by introducing a relative rotation angle along an axis, illustrated by arrow A1 in FIG. 1. As such, the second body 103 is rotated by $\theta_2$ from 0 to $\pi$, as best illustrated by arrow A2 in FIG. 1. Further, the first body 102 may be in a fixed position at some angle from 0 to $\pi$, illustrated as by $\theta_1$ in FIG. 1.

In some embodiments, the first body 102 may be a heat source to generate a heat and the second body 103 may be a heat receiver or a heat sink.

In some embodiments, the thickness d of the N multilayers 106 of the first body 102 may change or be modified by changing the properties of the dielectric 108 thereby changing the gap g. The thickness $d_1$ of the N multilayers 112 of the second body 103 may change or be modified by changing the properties of the dielectric 116 thereby changing the gap $g_1$. Such change or modification may be caused by a controller 122a (FIG. 2A) communicatively coupled to the first body 102 (FIG. 2A) and such change or modification may be caused by a controller 122b (FIG. 2A) communicatively coupled to the second body 103. In some embodiments, the controller 122a and the controller 122b may be a single controller. In other embodiments, the controller 122a and the controller 122b may be more than two controllers.

In some embodiments, when the dielectric 108 of the N multilayers 106 and the dielectric 116 of the N multilayers 112 are equal, as illustrated in FIG. 1, the gap g for each of the N multilayers 106 and the gap $g_2$ for each of the N multilayers 112 are equal. In other embodiments, the thickness between the N multilayers 106 of the first body 102 and/or or the thickness between the N multilayers 112 of the second body 103 may change.

As discussed in greater detail herein, the example multilayer thermal tunable system 100 may be tuned by rotation of the second body 103 and by changing the gap g of the dielectric 108 between adjacent layers 109 of the N multilayers 106 and/or changing the gap $g_2$ of the dielectric 116 between adjacent layers 118 of the N multilayers 112 simultaneously. Further, the example multilayer thermal tunable system 100 may couple more surface plasmonic modes to change the near-field radiative heat transfer. When the gap g of the dielectric 108 and/or the gap $g_2$ of the dielectric 116 size reduces to 0, the thermal switch ratio can increase compared to conventional switches.

Now referring to FIG. 2A, the controller 122b has manipulated the thickness between the N multilayers 112 of the second body 103 to be less than the thickness between the N multilayers 106 of the first body 102. For example, the controller 122a may have expanded the thickness between the N multilayers 106 of the first body 102 and the controller 122b may have contracted the thickness between the N multilayers 112 of the second body 103. In another example, the controller 122a may have maintained the thickness between the N multilayers 106 of the first body 102 and/or may otherwise have not done anything to change the thickness between the N multilayers 106 of the first body 102 (e.g., remains unchanged from an uncontracted state) and the controller 122b has controlled the thickness between the N multilayers 112 of the second body 103 into the contracted state to form the semi-infinite Weyl semimetal body without any multilayer decoration 203, as best illustrated on the right side, or action position, of FIG. 2A, and as discussed in greater detail herein.

That is, for explanation purposes only and as a non-limiting example, as illustrated in FIG. 2A, the first body 102 and the second body 103 may be both decorated by a multilayer structure where the number of N multilayers 106 of the first body 102 is equal to five layers (e.g., layers 109) and the number of N multilayers 112 of the second body 103 is also equal to five layers (e.g., layers 118). Each of the layers 109 may be a Weyl semimetal and may have the layer thickness d and the gap g defined by the thickness of the dielectric 108. Further, each of the layers 118 of the N multilayers 112 may be a Weyl semimetal and have the layer thickness $d_1$ and the gap $g_1$ is defined by the thickness of the dielectric 116.

The first body 102 and the second body 103 are separated by a central gap 115 that defines a distance ($d_0$) between the first body 102 and the second body 103 (and the semi-infinite Weyl semimetal body without any multilayer decoration 202 and the semi-infinite Weyl semimetal body without any multilayer decoration 203). The first body 102 is not rotated, but is held at a fixed angle from 0 to $\pi$. The second body 103 may be rotated by an angle $\theta_r$ about the Z-axis. The first body 102 and the second body 103 on the left side, or starting position, of FIG. 2A schematically illustrates an aspect where the gap size g of the first body 102 is greater than zero and the gap size $g_1$ of the second body 103 is also greater than zero. By changing the parameters of the controller 122b (e.g., applying a voltage, a current, an impedance, and/or the like) to influence the dielectric 116, the gap size $g_1$ defined by the thickness of the dielectric 116 of the second body 103 becomes zero such that the second body 103 becomes the semi-infinite Weyl semimetal body without any multilayer decoration 203.

That is, the controller 122b reduces or eliminates the gap $g_1$ defined by the dielectric 116 by manipulating the dielectric 116 such that the first surface 120a of each of the adjacent layers 118 abuts or is otherwise is in contact with, or now in close proximately to, the second surface 120b of the adjacent layer 118 of the N multilayers 112 and the first surface 120a of the layer 118 of the N multilayers 112 that is adjacent to the semi-infinite substrate 113 abuts or is otherwise is in contact with, or now in close proximately to, the inner surface 114a of the semi-infinite substrate 113. As such, the semi-infinite Weyl semimetal body without any multilayer decoration 203 is formed. In this aspect, the controller 122a and/or controller 122b maintains or does not change the distance $d_0$ of the central gap 115 between the first body 102 and the second body 103 and the first body 102 remains unchanged or not manipulated such that the gap g still exists between the N multilayers 106.

Now referring to FIG. 2B, in this example, the controller 122a may independently manipulate the thickness between the N multilayers 106 of the first body 102 by changing or manipulating the dielectric 108 and the controller 122b may independently manipulate the thickness between the N multilayers 112 of the second body 103 by changing or manipulating the dielectric 116. As such, on the left side, or starting position, of FIG. 2B, each of the first body 102 and the second body 103 are illustrated in the uncontracted state, or in the expanded state. This state for the first body 102 and/or the second body 103, may be the natural state or uncontrolled by the controller 122a, 122b, respectively, and/or the controller 122a may have expanded the thickness between the N multilayers 106 of the first body 102 and the controller 122b may have expanded the thickness between the N multilayers 112 of the second body 103.

As such, in a non-limiting example, in the expanded state, the number of N multilayers 106 of the first body 102, the thickness d of the N multilayers 106 of the first body 102 and the gap g generated or defined by the dielectric 108 positioned between each layer 109 of the N multilayers 106 is equal to the number of N multilayers 112 of the second body 103, the thickness $d_1$ of the N multilayers 112 of the second body 103 and the gap $g_1$ generated or defined by the dielectric 116 positioned between each layer 118 of the N multilayers 112. It should be understood that this example is non-limiting and the number of layers, the thickness and/or the gap of either the first body 102 and/or the second body 103 may be varied and does not have to be equal in the expanded state.

The right side, or action position, illustrated in FIG. 2B schematically depicts an example where the controller 122a has manipulated the dielectric 108 to change the thickness between the N multilayers 106 of the first body 102 to move from the expanded state into the contracted state, and independently, the controller 122b has manipulated the dielectric 116 to change the thickness between the N multilayers 112 of the second body 103 to move from the uncontracted state, or expanded state, into the contracted state.

That is, the controller 122a causes each of the N multilayers 106 of the first body 102 to contract by manipulating the dielectric 108, which in turn changes the thickness between the dielectric 108 positioned between each of the layers 109, thus eliminating the gap g between each of the N multilayers 106. Independently, the controller 122b causes each of the N multilayers 112 of the second body 103 to contract by manipulating the dielectric 116, which in turn changes the thickness of the dielectric 116 positioned between each of the layers 118, thus eliminating the gap $g_1$ between each of the N multilayers 112.

As such, as best illustrated on the right side of FIG. 2B, the first body 102 and the second body 103 have decreased in each of their lengths along the z-axis, but has also become a solid body the entire length along the z-axis. That is, each layer 109 of the N multilayers 106 makes contact with adjacent layers 109 of the first body 102 and each layer 118 of the N multilayers 112 makes contact with adjacent layers 118 of the second body 103, while maintaining the spacing $d_0$ of the central gap 115.

That is, for explanation purposes only and as a non-limiting example, as illustrated on the left side in FIG. 2B, the first body 102 and the second body 103 may be both decorated by a multilayer structure where the number of N multilayers 106 of the first body 102 is equal to five layers (e.g., layer 109) and the number of N multilayers 112 of the second body 103 is also equal to five layers (e.g., layer 118). Each of the layers 109 may be a Weyl semimetal and have the layer thickness d and the gap g generated or defined by the dielectric 108. Further, each of the layers 118 of the N multilayers 112 may be a Weyl semimetal and have the layer thickness $d_1$ and the gap $g_1$ generated or defined by the dielectric 116.

The first body 102 and the second body 103 are separated by the distance $d_0$ of the central gap 115. The first body 102 is not rotated, but is held at a fixed angle from 0 to $\pi$. The second body 103 may be rotated by an angle $\theta_r$ about the Z-axis. As depicted on the left side of FIG. 2B, the gap size g of the first body 102 is greater than zero and the gap size $g_1$ of the second body 103 is also greater than zero. By changing the parameters of the controller 122a (e.g., applying a voltage, a current, an impedance, and/or the like), the gap size g of the first body 102 becomes zero such that the first body 102 becomes the semi-infinite Weyl semimetal body without any multilayer decoration 202 and by changing the parameters of the controller 122b (e.g., applying a voltage, a current, an impedance, and/or the like), the gap size $g_1$ of the second body 103 becomes zero such that the second body 103 becomes a semi-infinite Weyl semimetal body without any multilayer decoration 203, as best illustrated on the right side of FIG. 2B.

As such, the controller 122a reduces or eliminates the gap g defined by the dielectric 108 positioned between successive or adjacent layers such that the first surface 110a of each of the layers 109 abuts or is otherwise in contact with, or now in close proximately to, the second surface 110b of adjacent layer 109 of the N multilayers 106. The first surface 110a of the layer 109 of the N multilayers 106 that is adjacent to the semi-infinite substrate 104 abuts or is otherwise in contact with, or now in close proximately to, the inner surface 105a of the semi-infinite substrate 104. As such, the first semi-infinite Weyl semimetal body without any multilayer decoration 202 is formed. In this aspect, the controller 122a maintains or does not change the distance $d_0$ of the central gap 115 between the first body 102 and the second body 103 (or the first semi-infinite Weyl semimetal body without any multilayer decoration 202 and the second semi-infinite Weyl semimetal body without any multilayer decoration 202).

The controller 122b reduces or eliminates the gap $g_1$ defined by the dielectric 116 positioned between successive or adjacent layers such that the first surface 120a of each of the layers 118 abuts or is otherwise in contact with, or now in close proximately to, the second surface 120b of adjacent layer 118 of the N multilayers 112. The first surface 120a of the layer 118 of the N multilayers 112 that is adjacent to the semi-infinite substrate 113 abuts or is otherwise in contact with, or now in close proximately to, the inner surface 114a of the semi-infinite substrate 113. As such, a second semi-infinite Weyl semimetal body without any multilayer decoration 203 is formed. In this aspect, the controller 122b also maintains or does not change the distance $d_0$ of the central gap 115 between the first body 102 and the second body 103 (or the first semi-infinite Weyl semimetal body without any multilayer decoration 202 and the second semi-infinite Weyl semimetal body without any multilayer decoration 202).

Figure 2C:
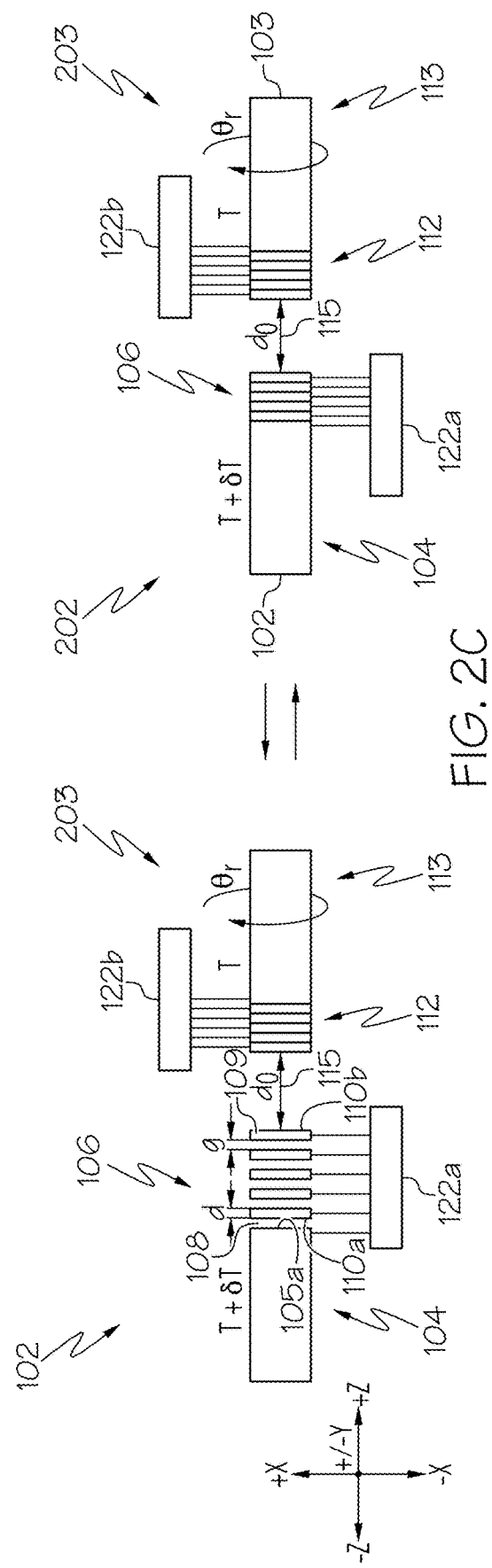
FIG. 2C schematically depicts a side view of the example multilayer thermal tunable system of FIG. 2A further illustrating the plurality of spaced apart Weyl semimetal multilayers of the first body controlled to change the gaps between the layers and the plurality of Weyl semimetal multilayers of the second body unchanged according to one or more embodiments shown and described herein.

Now referring to FIG. 2C, on the left side, or starting position, the controller 122b has already manipulated the thickness between the N multilayers 112 of the second body 103 to be less than the thickness between the N multilayers 106 of the first body 102, similar to the description above with respect to FIGS. 2A-2B. That is, the controller 122b has manipulated the dielectric 116 such that the second body 103 is transformed into the contracted state forming the semi-infinite Weyl semimetal body without any multilayer decoration 203. The first body is in the expanded state, similar to that in FIG. 2A.

With respect to the right side, or action side, of FIG. 2C, the controller 122a manipulates the dielectric 108 to reduce the thickness, or eliminates, the dielectric 108 positioned between successive or adjacent layers such that the first surface 110a of each of the layers 109 abuts or is otherwise in contact with, or now in close proximately to, the second surface 110b of adjacent layer 109 of the N multilayers 106. The first surface 110a of the layer 109 of the N multilayers 106 that is adjacent to the semi-infinite substrate 104 abuts or is otherwise in contact with, or now in close proximately to, the inner surface 105a of the semi-infinite substrate 104. As such, the semi-infinite Weyl semimetal body without any multilayer decoration 202 is formed. In this aspect, the controller 122a and/or the controller 122b maintains or does not change the distance $d_0$ of the central gap 115 between the semi-infinite Weyl semimetal body without any multilayer decoration 202 and the semi-infinite Weyl semimetal body without any multilayer decoration 203.

That is, the first body 102 and the second body 103 are still separated by the distance $d_0$ of the central gap 115. The first body 102 is not rotated, but is held at a fixed angle from 0 to π. The second body 103 may be rotated by an angle $\theta_r$, about the Z-axis. By changing the parameters of the controller 122a (e.g., applying a voltage, a current, an impedance, and/or the like) to manipulate the thickness of the dielectric 108, the gap size g of the first body 102 becomes zero such that the first body 102 becomes the semi-infinite Weyl semimetal body without any multilayer decoration 202.

Now referring back to FIGS. 2A-2C, in some embodiments, the distance $d_0$ of the central gap 115 is maintained between the first body 102 and the second body 103 regardless of the number of the N multilayers 106 or position thereof of the first body 102 and/or the number of N multilayers 112 of the second body 103 and/or position thereof (e.g., expanded state or contracted state that forms the semi-infinite Weyl semimetal body without any multilayer decoration 202 and the semi-infinite Weyl semimetal body without any multilayer decoration 203). In other embodiments, the distance $d_0$ of the central gap 115 is variable based on a number of factors including the number of N multilayers 106 and/or N multilayers 112. Further, the second body 103 may rotate regardless of the number of the N multilayers 112 or position thereof of the second body 103 (e.g., in the expanded state or in the contracted state). It should be appreciated that the second body 103 may rotate regardless of the number of the N multilayers 106 or position of the first body 102 (e.g., in the expanded state or in the contracted state). As such, the second body 103 may freely and independently rotate away from the z-axis by angle of $\theta_2$ ranging from 0 to π, illustrated by the arrow A1 in FIG. 1. As such, the semi-infinite Weyl semimetal body without any multilayer decoration 203 may freely and independently rotate away from the z-axis by angle of $\theta_2$ ranging from 0 to π, illustrated by the arrow A1 in FIG. 1.

Further, it should be understood that the controller 122a and the controller 122b may each independently or together be a microprocessor (central processing unit) that is communicatively coupled to the first body 102 and the second body 103, respectively. It should be appreciated that more than one microprocessor may be communicatively coupled to the first body 102 and/or the second body 103. The controller 122a and/or the controller 122b and the microprocessor(s) thereof may be a computer processor where the data processing logic and control are included on a single integrated circuit, or a small number of integrated circuits and contains the arithmetic, logic, and control circuitry required to perform the functions of a computer's central processing unit. As such, the controller 122a may be programmed to cause the dielectric 108 positioned between the N multilayers 106 of the first body 102 to move between the expanded state and the contracted state, and controller 122b may be programmed to cause the dielectric 116 positioned between the N multilayers 112 of the second body 103 to move between the expanded state and the contracted state and to cause the second body 103 to rotate.

It should be understood that when multilayer structures are included, significantly more surface plasmonic modes are excited. The additional modes will act as additional channels for radiative heat transfer from the first body 102 to the second body 103. When the second body 103 is rotated by an angle, the photon transmission probability changes, providing one more control knobs for tuning the heat transfer, as discussed in greater detail herein.

Referring back to FIGS. 1 and 2A-2C and now to FIGS. 3A-3E, the heat transfer coefficient h for the example multilayer thermal tunable system 100 is illustrated in Equation 1 below:

$$h = \frac{\partial}{\partial T} \int_0^\infty \frac{d\omega}{2\pi} \Theta(\omega, T) \int_{-\infty}^\infty \frac{d\beta}{2\pi} |\beta| \int_0^\pi \int_0^\infty \frac{d\phi}{2\pi} \xi_{ex}(\omega, \beta, \phi), \quad (1)$$

where $$\Theta(\omega, T) = \frac{\hbar\omega}{\exp\left(\frac{\hbar\omega}{k_B T}\right) - 1}$$

is the mean thermal energy of a single optical mode at the frequency ω and the temperature T, $\hbar$ and $k_B$ are the reduced Planck constant and the Boltzmann constant, respectively. β is the wavenumber component parallel to the interface formed by the body and vacuum. $\xi_{ex}(\omega, \beta, \phi)$ is the photon tunneling probability in the (ω, β) space, where φ is the incident angle from the x-axis in the xz-plane, which can be expressed as in Equation 2 below for propagating waves ($|\beta|<k_0$, $k_0$ is the free space wavenumber) and evanescent waves ($|\beta|>k_0$):

$$\xi_{ex}(\omega, \beta, \phi) = \begin{cases} Tr[(\mathbb{I} - \mathbb{R}_2^\dagger \mathbb{R}_2)\mathbb{D}(\mathbb{I} - \mathbb{R}_1 \mathbb{R}_1^\dagger)\mathbb{D}^\dagger], & |\beta| < k_0 \\ Tr[(\mathbb{R}_2^\dagger - \mathbb{R}_2)\mathbb{D}(\mathbb{R}_1 - \mathbb{R}_1^\dagger)\mathbb{D}^\dagger]e^{-2\kappa_{z0} d_0}, & |\beta| > k_0 \end{cases} \quad (2)$$

where Tr( . . . ) is the matrix trace, $\mathbb{I}$ is the identity matrix, $$\mathbb{R}_j = \begin{pmatrix} r_j^{pp} & r_j^{ps} \\ r_j^{sp} & r_j^{ss} \end{pmatrix},$$

$$j = 1, 2,$$

is the reflection matrix that includes both s and p polarizations, and $$\mathbb{D} = (\mathbb{I} - \mathbb{R}_1 \mathbb{R}_2 e^{-2ik_{z0} d_0})^{-1} \; (|\beta| < k_0)$$

$$[\mathbb{D} = (\mathbb{I} - \mathbb{R}_1 \mathbb{R}_2 e^{-2\kappa_{z0} d_0})^{-1} \; (|\beta| > k_0)]$$

is the Fabry-Pérot type denominator for propagating waves (evanescent waves), where $k_{z0}=\sqrt{k_0^2-\beta^2}(|\beta|<k_0)[\kappa_{z0}=\sqrt{\beta^2-k_0^2}(|\beta|>k_0)]$ is the wavenumber component perpendicular to the interface of the body with vacuum, and the symbol † corresponds to taking the Hermitian conjugate.

The permittivity tensor of the Weyl semimetal for body j at the incident angle φ without rotation (i.e., $\theta_j=0$) is given by Equation 3a below:

$$\bar{\bar{\epsilon}}_w(\phi) = \mathfrak{R}(\phi) \begin{bmatrix} \epsilon_d & 0 & i\epsilon_a \\ 0 & \epsilon_d & 0 \\ -i\epsilon_a & 0 & \epsilon_d \end{bmatrix} \mathfrak{R}^T(\phi), \quad (3a)$$

where the rotation matrix is defined by Equation 3b below:

$$\mathfrak{R}(\phi) = \begin{pmatrix} \cos(\phi) & -\sin(\phi) & 0 \\ \sin(\phi) & \cos(\phi) & 0 \\ 0 & 0 & 1 \end{pmatrix}. \quad (3b)$$

For cases where $\theta_j \neq 0$, the rotation matrix needs to be changed from $\mathfrak{R}(\phi)$ to $\mathfrak{R}(\phi+\theta_j)$. In Equation 3a above, $$\epsilon_a = \frac{be^2}{2\pi^2 \epsilon_0 \hbar \omega}$$

is the off-diagonal component with 2b being the separation between the two Weyl nodes along the y-axis (i.e., $b=b\hat{y}$ as depicted in FIG. 1) and $\epsilon_d$ is the diagonal component that can be calculated based on the Kubo-Greenwood formalism to a two-band model with spin degeneracy, as illustrated in Equation 4 below:

$$\epsilon_d = \epsilon_b + \frac{ir_s g_w}{6\Omega_0} \Omega G\!\left(\frac{\Omega}{2}\right) - \qquad (4)$$

$$\frac{r_s g_w}{6\pi\Omega_0}\left\{\frac{4}{\Omega}\left[1 + \frac{\pi^2}{3}\left(\frac{k_B T}{E_F}\right)^2\right] + 8\Omega \int_0^{\eta_c} \frac{G(\eta) - G\!\left(\frac{\Omega}{2}\right)}{\Omega^2 - 4\eta^2} \eta d\eta\right\},$$

where $$\Omega = \frac{\hbar(\omega + i\tau^{-1})}{E_F(T)}$$

is me normalized complex frequency with $\tau^{-1}$ being the Drude damping rate which accounts for the loss, and $$\Omega_0 = \frac{\hbar\omega}{E_F}$$

is the normalized real frequency, $G(E)=n(-E)-n(E)$ with $n(E)$ being the Fermi distribution function, $$\eta = \frac{E}{E_F}$$

with $E_F$ being the chemical potential $$r_s = \frac{e^2}{4\pi\epsilon_0 \hbar v_F}$$

is the effective fine-structure constant, $v_F$ is the Fermi velocity, g is the number of Weyl points, and $$\eta_c = \frac{E}{E_c}$$

is the cut-off energy beyond which the dispersion relation is no longer linear and the material parameters $E_F$=0.15 eV at 300 K, $g_w$=2, the background dielectric constant $\epsilon_b$=6.2, $b=2\times10^9$ m$^{-1}$, $v_F$=0.83×10$^5$ m/s, $\tau$=1×10$^{-12}$ s, and $\eta_c$=3, which are typical for doped Weyl semimetals and closed to the values for $Co_3MnGa$ and $Co_2MnGa$.

With reference to Equation 2 above, each Fresnel reflection coefficient in the matrix $\mathbb{R}_j$, defined at the interface between the body j and vacuum with m-polarized incident wave and n-polarized reflected wave $r_j^{mn}$(m(n)=s, p) is determined through solving the Maxwell's equation by matching the tangential components, as illustrated by Equation 5 below:

$$\begin{pmatrix} \partial E_x/\partial z \\ \partial E_y/\partial z \\ \alpha \partial H_x/\partial z \\ \alpha \partial H_y/\partial z \end{pmatrix} = iK \begin{pmatrix} E_x \\ E_y \\ \alpha H_x \\ \alpha H_y \end{pmatrix}, \quad (5)$$

where K is a 4×4 matrix to be solved for eigenvalues and eigenvectors, and $\alpha=\sqrt{\mu_0/\epsilon_0}$, where $\epsilon_0$ and $\mu_0$ are the free space permittivity and permeability.

As such, the transfer matrix method is used where the incident electric fields in the forward and backward directions, $E_0^+$ and $E_0^-$, are linked with those in the $N^{th}$ layer, $E'_N{}^+$ and $E'_N{}^-$, in the example multilayer thermal tunable system by a transfer matrix $\overline{T}=D_0^{-1}\Pi_{n=1}^{N-1}(D_n P_n D_n^{-1})D_N$, where $D_n$ and $P_n$ are solved for each layer n based on the eigenvectors and eigenvalues found in Equation 5 and the photon tunneling probability can be computed for the example multilayer thermal tunable system 100 using Equations 2-5.

Still referring to FIG. 1, FIGS. 2A-2C, and FIGS. 3A-3E, the example multilayer thermal tunable system 100 increases the heat transfer coefficient by changing the surface states or the number of layers of the N multilayers 106 and/or N multilayers 112. It should be appreciated that why some of the description below refers to N multilayers 112, this is for brevity reason and may also apply to N multilayers 106. As such, N multilayers 106 may be identical to N multilayers 112 except the second body 103 may rotate and the first body 102 is fixed at some angle. As such, it should be understood that N multilayers 112 of the second body 103 discussed below also applies to N multilayers 106 of the first body 102.

The heat transfer coefficient h may be increased by changing the surface states or the number of layers of the N multilayers 112. For example, with a temperature of T=300 K and an infinitesimal $\Delta T$, the N multilayers 112 dimensions to be $d_1(d)=g_1(g)=d_0$=10 nanometers (nm), for two rotation angles $\theta_2$=0 (illustrated as empty circles in FIG. 3A) and π (illustrated as filled circles in FIG. 3A), respectively, the heat transfer coefficient h for the example multilayer thermal tunable system 100 may be calculated with varying the number of Weyl semimetal layers. The heat transfer coefficient h may have the capability of moving the heat from the first body 102 to the second body 103 at a temperature gradient. Further, as discussed herein, the number of layers 118 of the N multilayers 112 changes or influences the heat transfer coefficient h. As such, the heat transfer coefficient may be normalized by the case of N=30 layers as $h/h_{N=30}$, and are plotted in FIG. 3A.

Figure 3A:
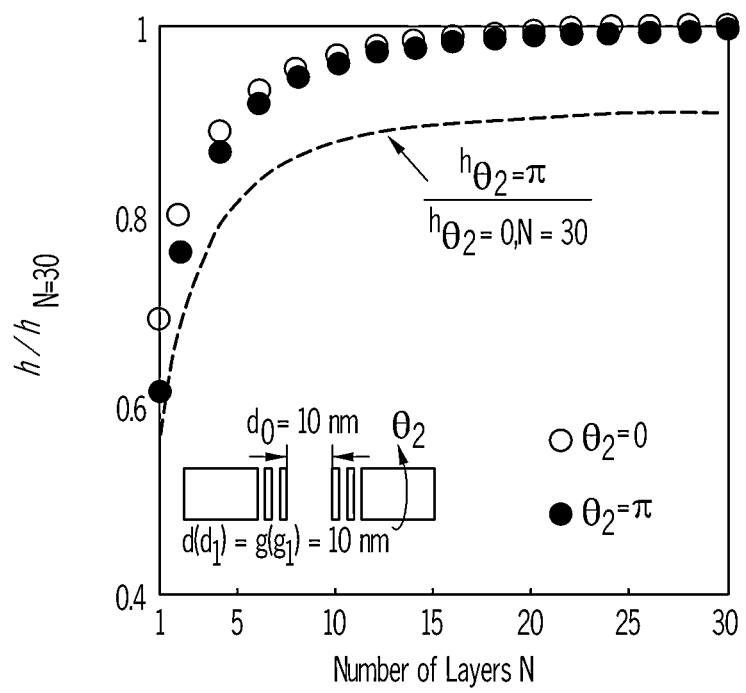
FIG. 3A schematically depicts a graphical representation of a heat transfer coefficient of the example multilayer thermal tunable system of FIG. 1 normalized with respect to that of an example multilayer structure having thirty layers, according to one or more embodiments shown and described herein.
Figure 3B:
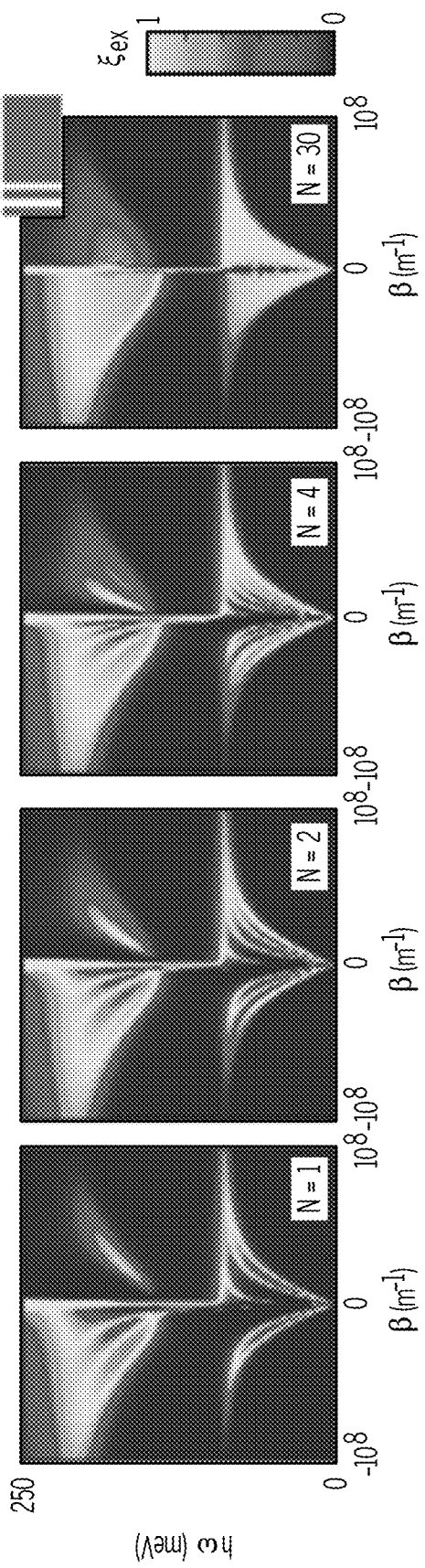
FIG. 3B schematically depicts a graphical representation of photon tunneling probabilities of the example multilayer thermal tunable system of FIG. 1 with a first body and a various number of Weyl semimetal multilayers thereof without rotation as a function of number of layers according to one or more embodiments shown and described herein.
Figure 3C:
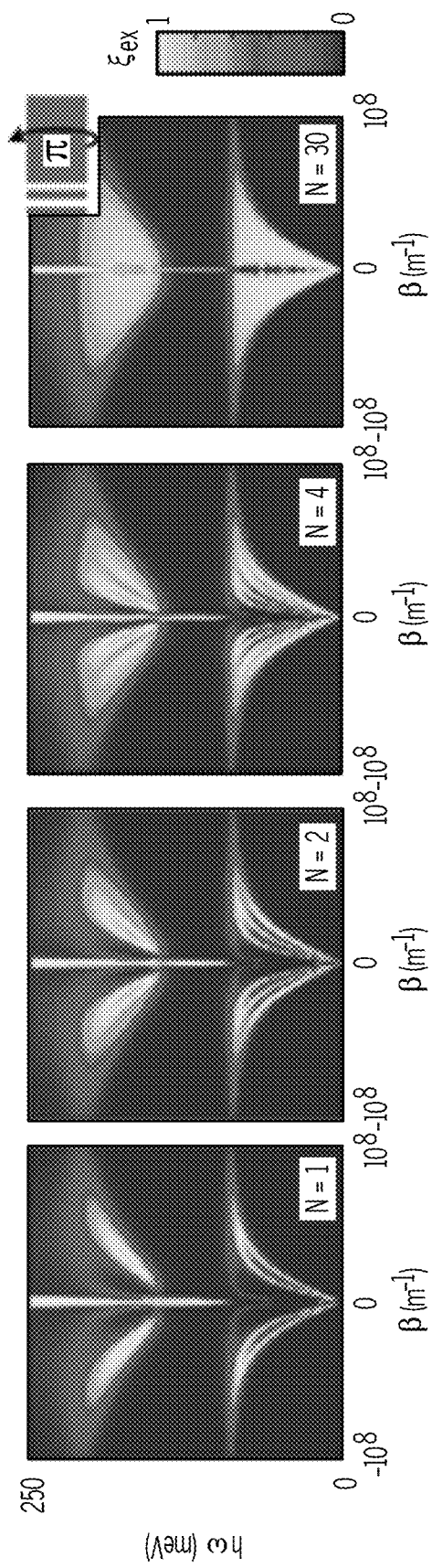
FIG. 3C schematically depicts a graphical representation of photon tunneling probabilities of the example multilayer thermal tunable system of FIG. 1 with a second body and a various number of Weyl semimetal multilayers thereof with rotation of $\pi$ as a function of number of layers according to one or more embodiments shown and described herein.

As illustrated in FIG. 3A, the number of layers 118 of the N multilayers 112 increases, $h/h_{N=30}$ increases steeply at the beginning and saturates asymptotically. Such a trend may also be understood by plotting the photon tunneling probability $\xi_{ex}(\omega, \beta, \phi=0)$ at the zero incident angle, as depicted in FIGS. 3B-3C. It should be appreciated that both s and p polarizations are considered and thus $\xi_{ex}$ ranges from 0 to 2. As such, the color bars are set to be between 0 and 1, for better visualization of the p-polarized evanescent waves, which dominantly contribute to the near-field heat transfer. As additional modes appear in the two frequency bands because the number of layers 118 increases, when N=30, the region in the frequency bands is almost full of those modes, which agrees with the saturation of $h/h_{N=30}$ in FIG. 3A. Further, in comparing FIG. 3B-3C, when $\theta_2$=0, nonreciprocal surface Plasmon polariton (SPP) modes appear in FIG. 3B, whereas the π rotation eliminates the nonreciprocity. As such, the example multilayer thermal tunable system 100 is reciprocal at $\theta_2$=π despite the incident angle $\phi \in [0, \pi]$, while the level of non-reciprocity in the example multilayer thermal tunable system 100 with $\theta_2$=0 changes by varing φ latter of which is similar to what was observed for conventional two bulk Weyl semimetal bodies.

Figure 3D:
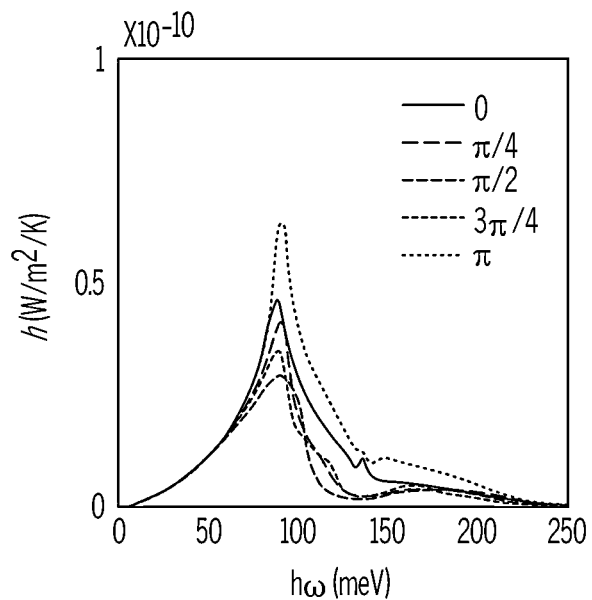
FIG. 3D schematically depicts a graphical representation of a spectral heat transfer coefficient of the example multilayer thermal tunable system of FIG. 1 for varying rotation of a second body and a various number of Weyl semimetal multilayers thereof according to one or more embodiments shown and described herein.

Such a difference may significantly impact the heat transfer enhancement in the example multilayer thermal tunable system 100. As such, as illustrated in FIG. 3A, the ratio $$\frac{h_{\theta_2=\pi}}{h_{\theta_2=0,N=30}}$$

is plotted to illustrate the suppression of h due to the rotation of π, arising from the mismatched SPP modes in the example multilayer thermal tunable system 100. In addition, the spectral heat transfer coefficient h(ω) for selected rotation angles $$\theta_2 = 0, \frac{\pi}{4}, \frac{\pi}{2}, \frac{3\pi}{4},$$

and π is calculated and plotted in FIG. 3D. As illustrated, the example multilayer thermal tunable system 100 is distinctively different from conventional systems where the rotation drastically changes the resonant frequency (i.e., peak locations) due to the excitation of largely nonreciprocal SPP. In the presence of N multilayers 112, the resonant frequency varies insignificantly with increasing $\theta_2$ from 0 to π, while the peak h(ω) is altered with a minimum achieved at $$\theta_2 = \frac{\pi}{2}$$

corresponding to the largest mismatch of SPP modes between the interfaces of the first body 102 and second body 103 facing the central gap 115. The shift of the resonant frequency is attributed to the absence of relative rotation between adjacent layers 118 in each multilayer stack that has Weyl semimetals such that the strong resonance can still be maintained in first body 102 and the second body 103 and dominantly contributes to the heat transfer coefficient h in a wide range of frequencies.

Figure 3E:
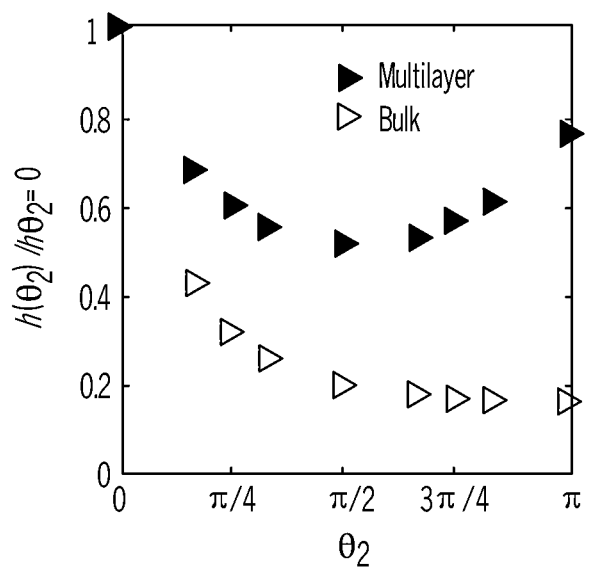
FIG. 3E schematically depicts a graphical representation of rotation-dependent heat transfer coefficients normalized of the example multilayer thermal tunable system of FIG. 1 with respect to that of the unrotated system of the example multilayer thermal tunable system of FIG. 1 according to one or more embodiments shown and described herein.

Now referring to FIG. 3E, a graphical representation of the rotation angle-dependent heat transfer coefficients h (=∫h(ω)dω) with each normalized by the unrotated counterpart for the example multilayer thermal tunable system 100, respectively, is schematically depicted. The heat transfer coefficient h for the example multilayer thermal tunable system 100 arrives at a minimum at $$\theta_2 = \frac{\pi}{2}$$

and then ascends until $\theta_2$=π, whereas for the conventional bulk systems, the heat transfer coefficient h drops more abruptly upon reaching $$\theta_2 = \frac{\pi}{2},$$

beyond which the change becomes negligible. Such distinct behaviors lead to growing heat transfer enhancement $$\frac{h_{multi}}{h_{bulk}},$$

which is maximized at $\theta_2$=π.

Figure 4A:
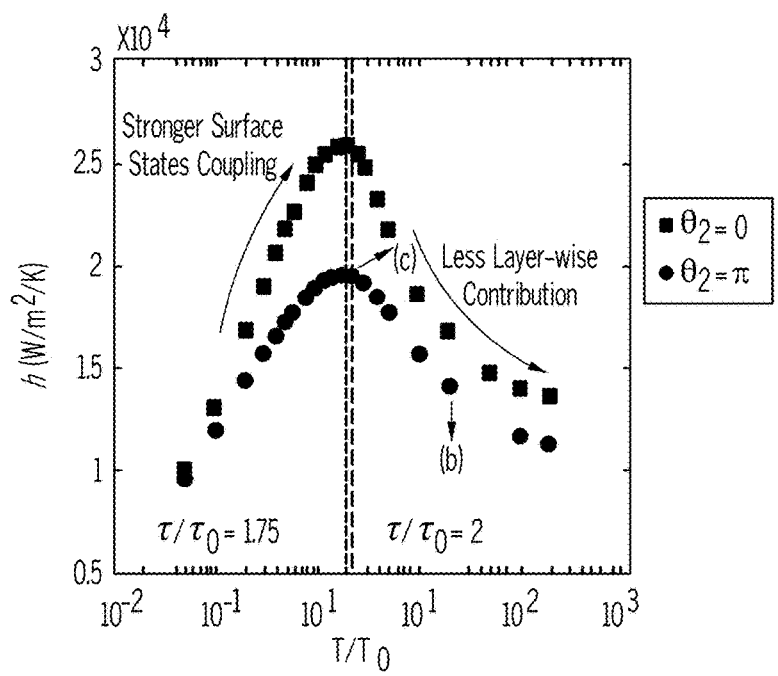
FIG. 4A schematically depicts a graphical representation of heat transfer coefficients as a function of normalized loss rate for the Weyl semimetal of the example multilayer thermal tunable system of FIG. 1 according to one or more embodiments shown and described herein.
Figures 4B, 4C:
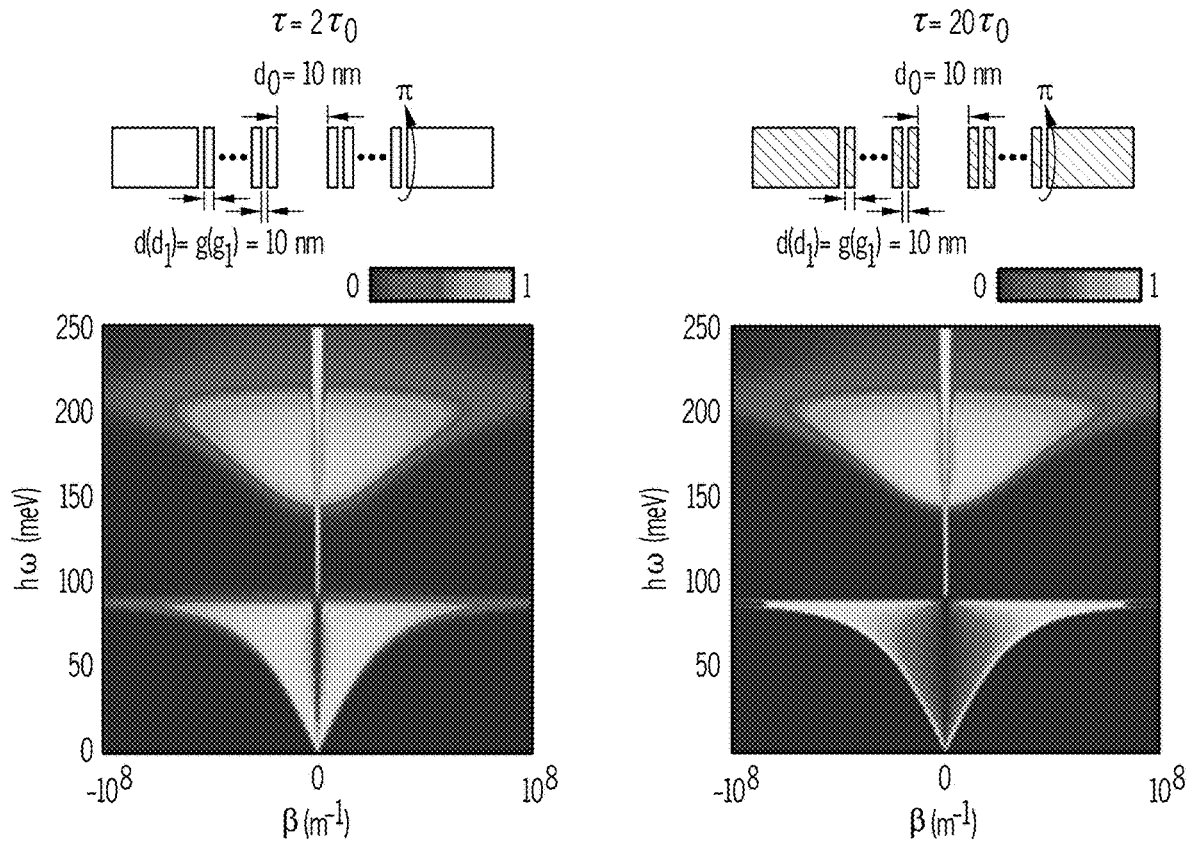
FIG. 4B schematically depicts a graphical representation of photon tunneling probabilities calculated for the Weyl semimetals of the example multilayer thermal tunable system of FIG. 1 with $\tau=2\tau 0$ according to one or more embodiments shown and described herein.
FIG. 4C schematically depicts a graphical representation of photon tunneling probabilities calculated for the Weyl semimetals of the example multilayer thermal tunable system of FIG. 1 with $\tau=20\tau 0$ according to one or more embodiments shown and described herein.

Referring to FIGS. 4A-4C, the near-field radiative heat transfer in the example multilayer thermal tunable system 100 made of two multilayer bodies (e.g., the first body 102 and the second body 103) may depend on the loss of the constituent materials. Low-loss materials allow surface states coupling to occur in deeper layers at the sacrifice of the layer-wise contribution to the heat transfer, whereas high-loss materials weaken the resonance that contributes to the heat transfer. As such, these two competing effects may imply that an intermediate loss may be favored. To illustrate such an occurrence, the example multilayer thermal tunable system 100 is setup with $d_1(d)=g_1(g)=d_0=10$ nm. The loss rate in the Weyl semimetal may be determined by the Drude damping rate $\tau^{-1}$ in Equation 4 above, which is the inverse of the relaxation time or lifetime. As such, τ may be used to discuss the loss effect on the heat transfer. For convenience, a normalized loss rate $\tau/\tau_0$, with $\tau_0=1\times10^{-12}$ s being the reference, representing the low- (i.e., longer lifetime and hence $\tau/\tau_0>1$) and high-loss (i.e., shorter lifetime and hence $\tau/\tau_0<1$) regimes is employed. As illustrated in FIG. 4A, the heat transfer coefficient h decreases sharply towards low-loss ($\tau/\tau_0>>1$) and high-loss ($\tau/\tau_0<<1$) limits despite the rotation angle $\theta_2$. For $\theta_2$=0 (plotted as a square in FIG. 4A), a slightly lower loss rate $\tau=1.75\tau_0$ may be optimal corresponding to the maximum h for the system considered. For $\theta_2$=π (plotted as a circle in FIG. 4A), the optimal loss rate becomes $\tau=2\tau_0$, and the reduced contribution from individual layers can be seen by comparing $\xi_{ex}(\hbar, \omega, \phi=0)$ for $\tau=2\tau_0$ as illustrated in FIG. 4B and $\tau=20\tau_0$ as illustrated in FIG. 4C. As such, lower loss allows more modes to be coupled while each mode appears to be "thinner" and tends to extend towards larger |β|.

Referring now to FIG. 5A-5D, the heat transfer enhancement of the example multilayer thermal tunable system 100 may by varying the spacing or distance $d_0$ of the central gap 115 for different loss rates is graphically depicted. The dimensions of the example multilayer thermal tunable system 100 are fixed as $d_1(d)=g_1(g)=d_0=10$ nm and focuses on two rotation angles $\theta_2$=0 and π. With respect to FIG. 5A, $\tau=\tau_0$ and $\theta_2$=0 (illustrated as curve 502) and π (illustrated as curve 504). For $\theta_2$=0, a maximized enhancement of ~3.3 is found at $d_0$=46 nm, whereas when $\theta_2$=π, the peak significantly rises to 16.4, corresponding to an increment of ~400%. The central gap 115 spacing or distance $d_0$, where the peak locates also moves from 46 nm by around 25% to 34 nm. As such, the central gap 115 spacing or distance $d_0$ is the optimal gap (i.e., $d_0>d_1(d)=g_1(g)$). Such a result may be due to the off-diagonal components in the permittivity tensor. The heat transfer coefficients h computed using the transfer matrix method (exact) are compared to the effective medium theory (EMT). For the latter, the effective permittivity tensor derived for magneto-optical materials and takes into account the dependences on the incident angle ϕ, which is defined below in Equation 6:

$$\bar{\bar{\epsilon}}_{eff}(\phi) = \Re(\phi) \begin{bmatrix} \epsilon_\parallel & 0 & i\epsilon_{\perp,a} \\ 0 & \epsilon_\parallel & 0 \\ -i\epsilon_{\perp,a} & 0 & \epsilon_{\perp,d} \end{bmatrix} \Re^T(\phi). \quad (6)$$

Equation 6 provides the form applied to the examples without the rotation of body j (e.g., the second body 103 regardless of uncontracted, or expanded state, and the contracted state). To consider the rotation, ϕ in Equation 6 needs to be changed to ϕ+θ$_j$. The validity of the EMT is justified by the periodicity is far smaller as compared to the spacing or distance d$_0$ of the central gap 115 in the near-field radiative heat transfer. As graphically depicted in the left panel of FIG. 5B, when θ$_2$=0, the exact, depicted as a solid line, and EMT results, depicted as a dashed line, agree and follow the well-known d$_0^{-2}$ dependence for 10≤d$_0$≤1000 nm, indicating moderate surface states coupling, which differs from conventional systems, where the surface states dominated and the exact solution far exceeded the EMT estimation. When the central gap 115 spacing or distance d$_0$ is a few nanometers, the exact result approaches the bulk system, depicted by the dotted line, since the two layers facing the central gap 115 dominantly contribute to the heat transfer.

Figure 5A:
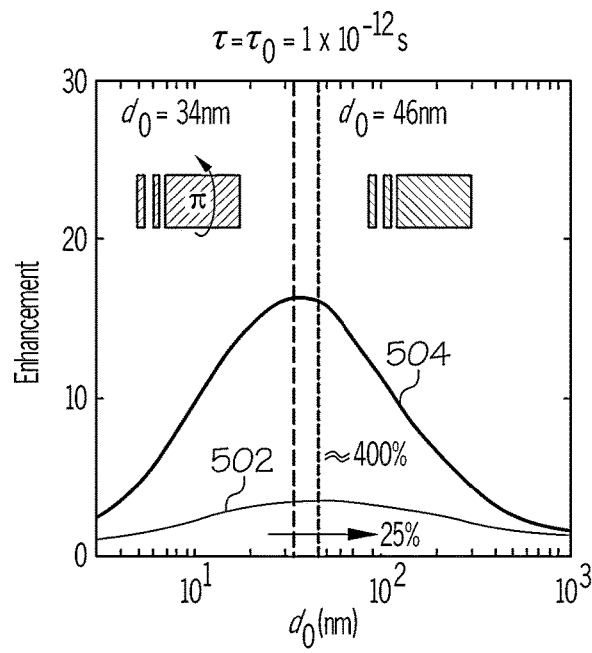
FIG. 5A schematically depicts a graphical representation of heat transfer enhancement as a function of a central gap spacing between a source substrate and a receiver substrate of the example multilayer thermal tunable system of FIG. 1 and rotation from 0 to $\pi$ according to one or more embodiments shown and described herein.
Figure 5B:
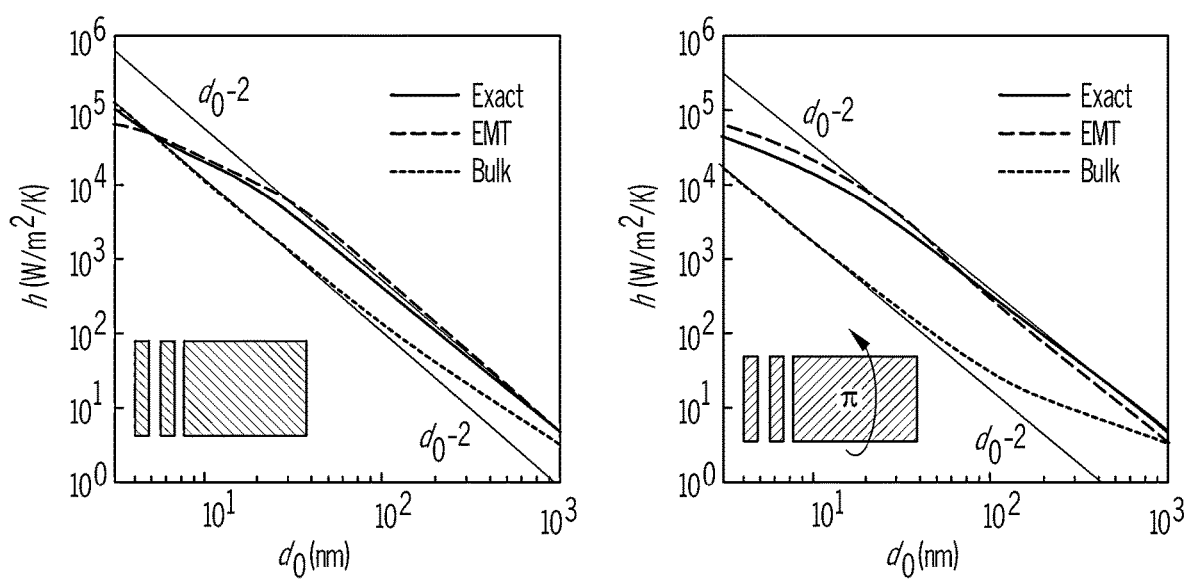
FIG. 5B schematically depicts a graphical representation of a comparison of heat transfer coefficients with respect to a central gap of the example multilayer thermal tunable system of FIG. 1 calculated by a transfer matrix method and by an effective medium theory according to one or more embodiments shown and described herein.

When θ$_2$=π, as graphically illustrated in the right panel of FIG. 5B, the contrast of the heat transfer coefficient h between the example multilayer thermal tunable system 100 and conventional bulk systems becomes much larger than in the unrotated example. The rotation of π increases the mismatch between the SPP modes between the two multilayer-bodies (e.g., the first body 102 and the second body 103), which suppresses the heat transfer. Such suppression is stronger in the bulk system, and is compensated by the coupled surface states in the example multilayer thermal tunable system 100, giving rise to the higher enhancement.

Figure 5C:
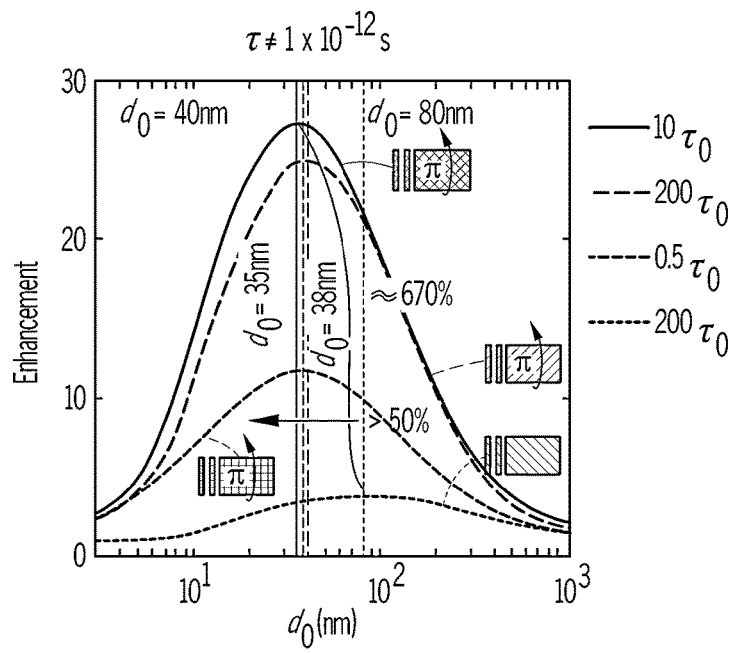
FIG. 5C schematically depicts a graphical representation of a heat transfer enhancement as a function of a central gap of the example multilayer thermal tunable system of FIG. 1 for systems that include Weyl semimetals with higher or lower loss rates and the rotations of 0 and $\pi$ according to one or more embodiments shown and described herein.

By decreasing the loss in the Weyl semimetal by setting τ>τ$_0$, as illustrated in FIG. 5C, the small dash line corresponds to the unrotated case with τ=200τ$_0$ (i.e., 200-time less loss). The peak enhancement of ~3.5 is comparable as that of τ=τ$_0$, even though the loss is reduced by two orders of magnitude. The optimal spacing or distance d$_0$ of the central gap 115 shifts to 80 nm, which nearly doubles that of τ=τ$_0$. Reduced loss allows pronounced contribution from the large wavevector regime (i.e., larger |β|) to the heat transfer, as illustrated in FIGS. 3A-3C. While the heat transfer coefficient h considerably decreases with increasing the spacing or distance d$_0$ of the central gap 115 in the bulk system, the coupled surface states persist in the example multilayer thermal tunable system 100, as graphically illustrated in left panel of FIG. 5D.

As the example multilayer thermal tunable system 100 approaches the bulk system at a small central spacing gap d$_0$, indicating that the larger spacing gap d$_0$ of the central gap 115 is necessary to fully take advantage of surface states coupling in each layer 118 of the N multilayers 112, which may be advantageous for low loss cases. The gap d$_0$ of the central gap 115 and the coupling between the first body 102 and the second body 103 weakens and the enhancement is impaired. When θ$_2$=π, as illustrated by the larger dashed line in FIG. 5C with τ=200τ$_0$, the enhancement is significantly improved to ~24.7 (a ~600% boost) together with its peak relocating to gap d$_0$=35 nm (a ~50% shift) of the central gap 115.

Figure 5D:
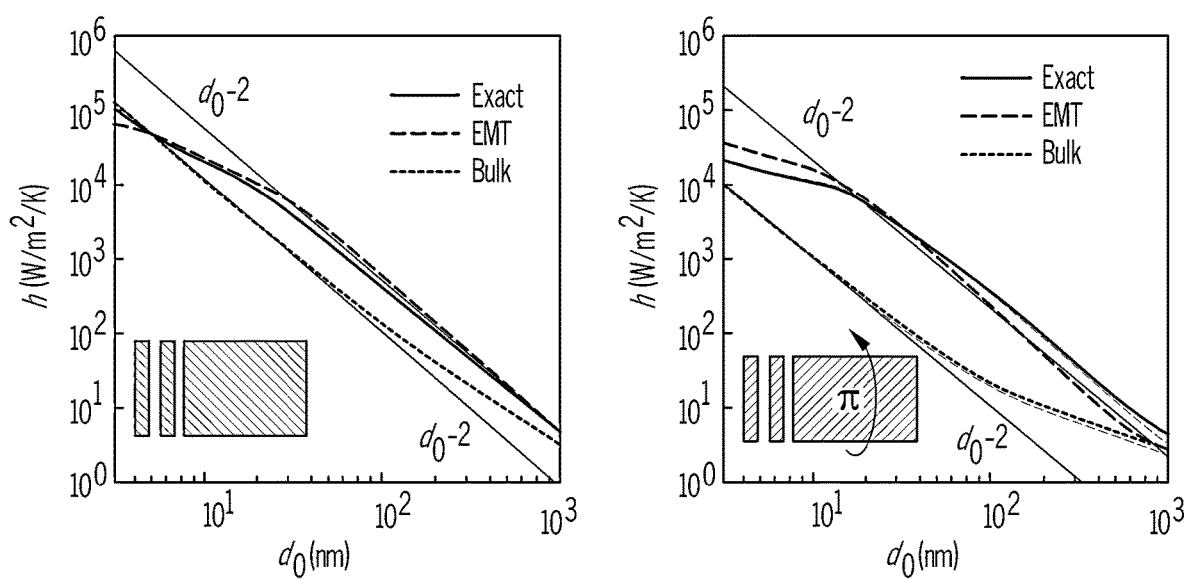
FIG. 5D schematically depicts a graphical representation of a comparison between the exact solution and the effective medium theory prediction of the heat transfer coefficient with respect to a central gap of the example multilayer thermal tunable system of FIG. 1 according to one or more embodiments shown and described herein.

The comparison between the exact solution, illustrated as a solid line, and the EMT prediction of the heat transfer coefficient h, illustrated as a dashed line, in the right panel of FIG. 5D, graphically illustrates a transition near the spacing or distance d$_0$=35 nm of the central gap 115, after which the exact heat transfer coefficient h exceeds the EMT. Such an example may indicate a strengthened surface state coupling benefited from decreased loss and the absence of non-reciprocity. Further, the contributions from the far-field in both the example multilayer thermal tunable system 100 and bulk systems are minimal by overlaying the heat transfer coefficient h computed purely based on evanescent waves, as illustrated in FIG. 5D by dashed curves in the left panel. When τ=10τ$_0$, a slightly improved enhancement of ~27.1 (a ~670% boost) is seen at distance d$_0$=35 nm pf the central gap 115, as illustrated in FIG. 5C. This further increment may imply that the balance between the two competing effects, discussed with respect to FIGS. 3A-3C, which may be further proven by the illustrated medium dashed line in FIG. 5C corresponding to a higher loss of τ=0.5τ$_0$.

Figure 6:
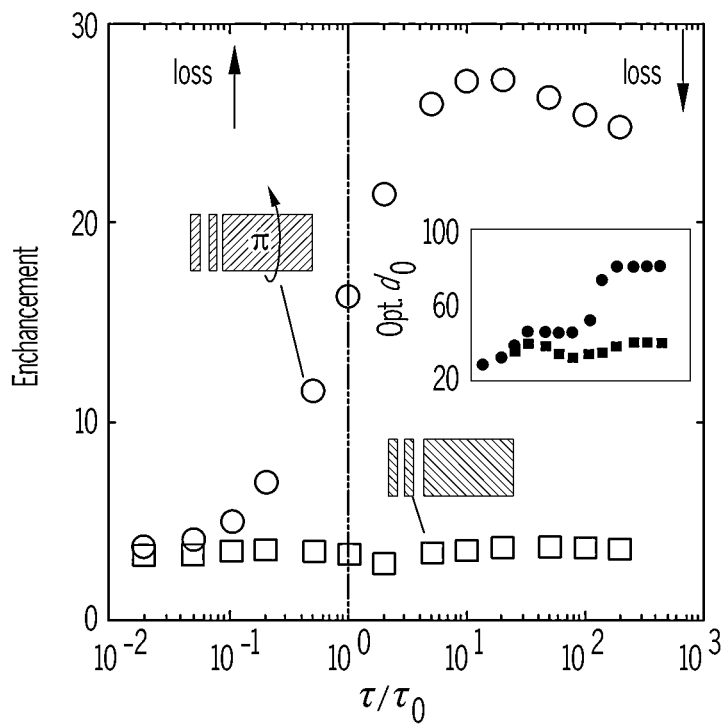
FIG. 6 schematically depicts a graphical representation of the heat transfer enhancement for the example multilayer thermal tunable system of FIG. 1 according to one or more embodiments shown and described herein.

FIG. 6 graphically depicts a dependence of the heat transfer enhancement on the loss rate by considering 0.01τ$_0$≤τ≤200τ$_0$. The loss rate τ is related to the carrier mobility in the Weyl semimetal and the carrier mobility may be modified by doping. As illustrated, when the example multilayer thermal tunable system 100 has no rotation, the enhancement remains almost invariant to the loss rate and stabilizes at around 3.5. When a π rotation is applied, the enhancement exhibits strong dependence on the loss rate and a peak enhancement up to 27.2 is found at τ=20τ$_0$. The optimal distance or gap d$_0$ of the central gap 115 corresponding to each τ/τ$_0$ is plotted in the inset and a roughly increasing trend is noted with enlarging τ/τ$_0$ regardless of the rotation, such that there exists a persistently strong surface states coupling in the example multilayer thermal tunable system 100 even with large distance or spacing d$_0$ of the central gap 115. The trend is not strictly monotonous, the optimal distance or spacing d$_0$ of the central gap 115 corresponding to θ$_2$=π is smaller than that of θ$_2$=0.

As illustrated in FIG. 6, the notable difference between the unrotated (plotted as empty squares) and the π-rotated (plotted as empty circles) examples may also reveal the effect of the off-diagonal components in the permittivity tensor, $\epsilon_a$. As illustrated in Equation 4, τ may impact the diagonal component of the permittivity tensor $\epsilon_d$, which may indicate why the heat transfer enhancement is not strongly affected by varying τ in the example multilayer thermal tunable system 100 with θ$_2$=0, whose nonreciprocity is relatively strong. The optimal condition, as illustrated in FIG. 6, may be where τ=20τ$_0$ and θ$_2$=π. Noting that $\epsilon_a$ depends on b, whose physical significance is related to the separation between two Weyl nodes, $\epsilon_a$ may be varied in a relatively limited range 0.1≤$\epsilon_a$/$\epsilon_{a,0}$≤3, where $\epsilon_{a,0}$ is the reference value calculated based on b=2×10$^9$ m$^{-1}$.

Figure 7A:
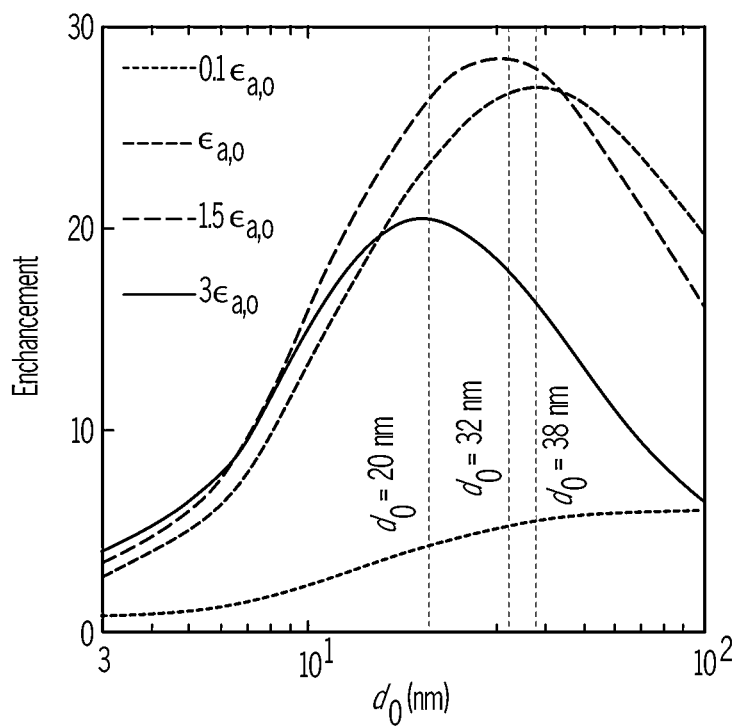
FIG. 7A schematically depicts a graphical representation of heat transfer enhancement as a function of a central gap of the example multilayer thermal tunable system of FIG. 1 for varying off-diagonal components in a permittivity of the Weyl semimetal according to one or more embodiments shown and described herein.
Figure 7B:
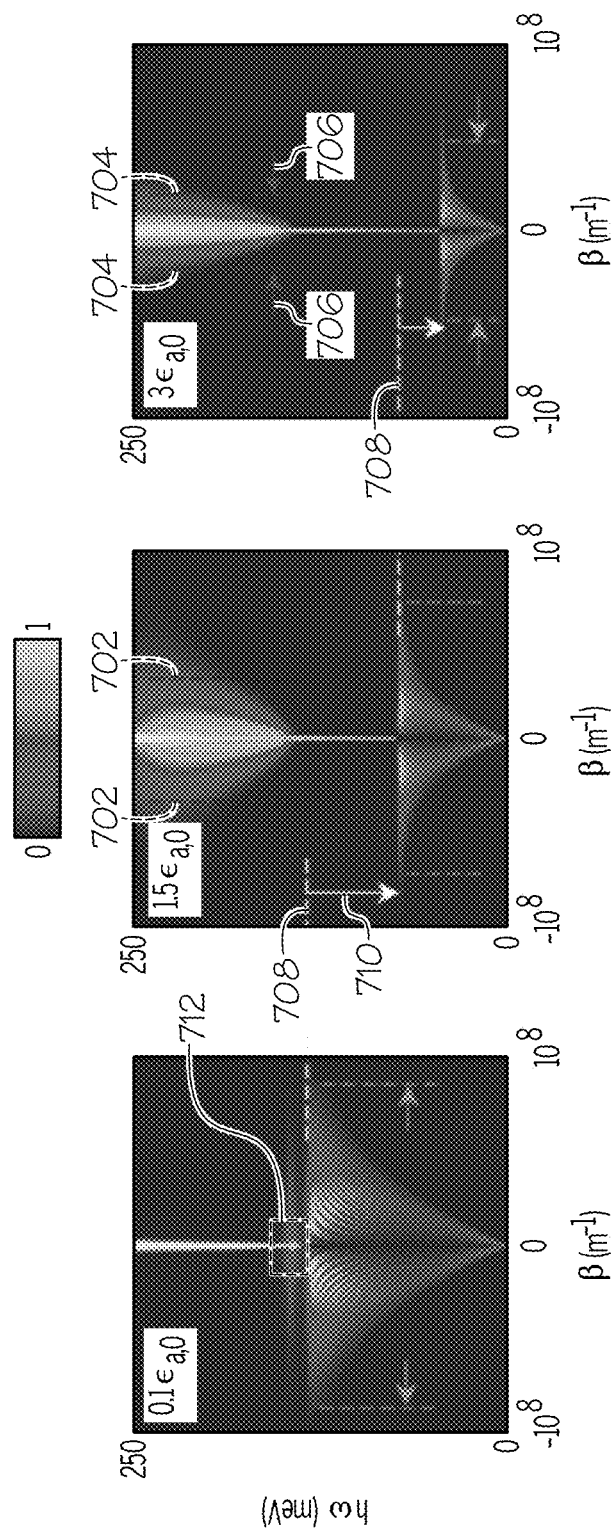
FIG. 7B schematically depicts a graphical representation of photon tunneling probabilities corresponding to the example multilayer thermal tunable system of FIG. 1 at specific permittivity according to one or more embodiments shown and described herein.

Now referring to FIGS. 7A-7D, as illustrated in FIG. 7A, for $\epsilon_a$=0.1$\epsilon_{a,0}$), (depicted as a dotted line) the enhancement becomes much smaller compared with that of $\epsilon_a$=$\epsilon_{a,0}$ (depicted as a small dashed line) when increasing $\epsilon_a$/$\epsilon_{a,0}$ to 1.5 (depicted as a larger dashed line), the peak enhancement surpasses that of $\epsilon_a$=$\epsilon_{a,0}$, reaching a peak of 28.4 at the distance or spacing d$_0$=32 nm of the central gap 115. As such, it is possible to further enhance the heat transfer of the example multilayer thermal tunable system 100 by tuning $\epsilon_a$ at $\epsilon_a=3\epsilon_{a,0}$ (depicted as a solid line), the peak enhancement decreases, indicating a relatively narrow window for optimizing $\epsilon_a$, i.e. $1 \le \epsilon_a/\epsilon_{a,0} \le 3$.

With respect to the optimal distance or spacing $d_0$ of the central gap 115 in FIG. 7A, the values decrease monotonically as $\epsilon_d/\epsilon_{a,0}$ is increased. The photon tunneling probability at zero incident angle for the example multilayer thermal tunable system 100 with spacing $d_0=32$ nm, which corresponds to the peak of the curve for $\epsilon_a=1.5\epsilon_{a,0}$ and $\epsilon_d/\epsilon_{a,0}=0.1$, 1.5, and 3, respectively, as provided in FIG. 7B, for $\epsilon_d/\epsilon_{a,0}>1$, illustrated in the middle and right panels in FIG. 7B. The SPP modes at both high and low frequencies shrink towards smaller wavevectors $|\beta|$, illustrated by dashed line 702 and the latter exhibits an additional red shift illustrated by dashed line 704 and arrows 706. On the other hand, for $\epsilon_d/\epsilon_{a,0}<1$, illustrated in FIG. 7B, the SPP modes at low frequencies broaden illustrated by dashed line 708 and arrows 710 and feature a blue shift illustrated by the dashed line 708 and arrows 710. The SPP modes at high frequency drastically moves downward and the corresponding coupled surface states nearly vanish illustrated by the dash line 712. The diminishing contribution from the high-frequency band causes the reduced enhancement. As such, in some embodiments, $\epsilon_a=1.5\epsilon_{a,0}$ may be optimal of favored. Further still, larger $\epsilon_a$ tends to recover that the optimal enhancement is realized when $d_0=d_1(d)=g_1(g)$ in the example multilayer thermal tunable system 100.

Figure 7C:
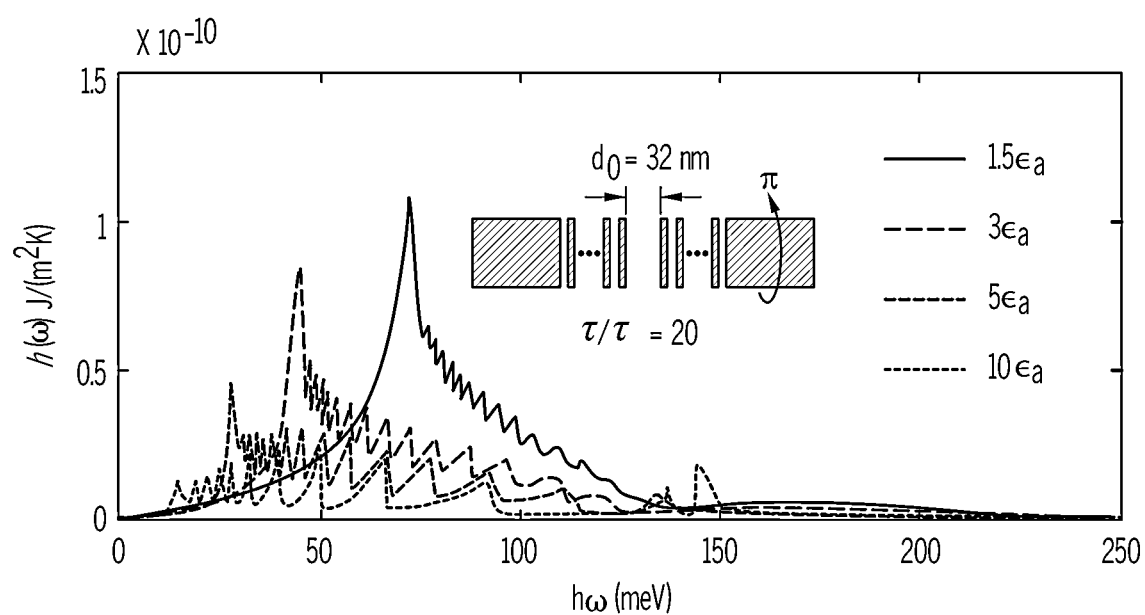
FIG. 7C schematically depicts a graphical representation of spectral heat transfer coefficient for the example multilayer thermal tunable system of FIG. 1 with a central gap at a constant spacing for the specific permittivity according to one or more embodiments shown and described herein.

FIG. 7C graphically illustrates the enhancement is increased up to $\epsilon_a=10\epsilon_{a,0}$ while keeping $\tau=20\tau_0$ and $\theta_2=\pi$, which illustrates that as $\epsilon_a$ increases, the optimal spacing or distance $d_0$ of the central gap 115 consistently decreases. At $\epsilon_a=10\epsilon_{a,0}$, a peak enhancement of ~3.8 shows up at $d_0=10$ nm, which is the same as the layer thickness ($d_1$) of the layers 118 and the gap ($g_1$) created from or defined by the dielectric 116.

Figure 7D:
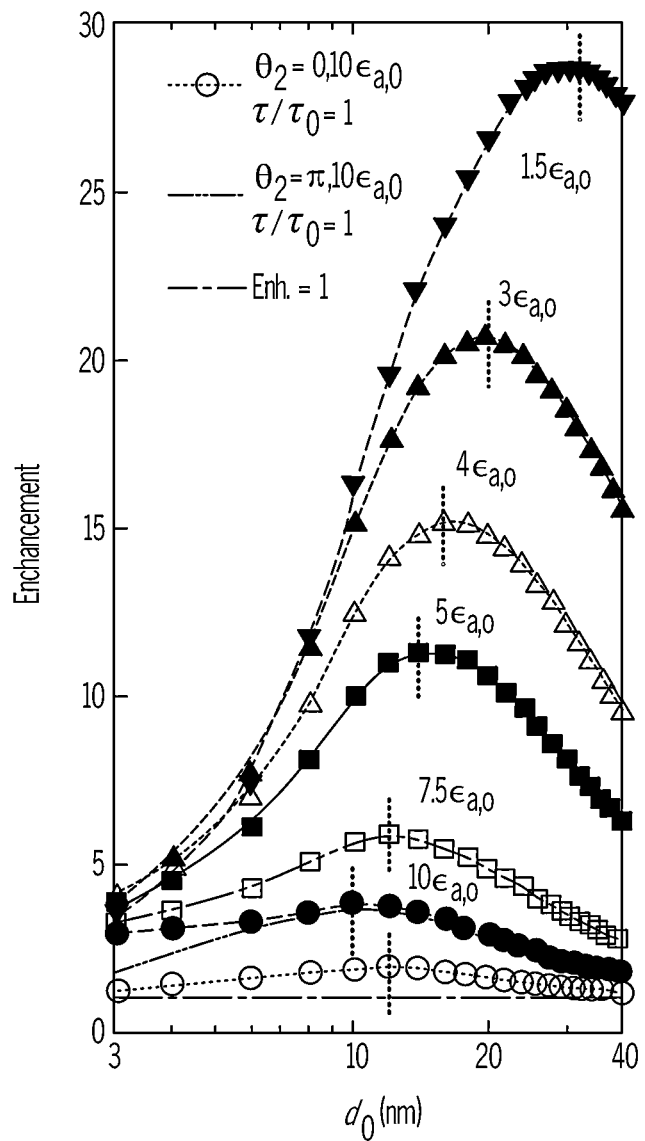
FIG. 7D schematically depicts a graphical representation of the loss rate of $20\tau 0$ and $\pi$ rotation in the example multilayer thermal tunable system of FIG. 1 according to one or more embodiments shown and described herein.

Referring to FIG. 7D, to decouple the effect of the rotation $\theta_2$, the loss rate $\tau$, and the off-diagonal components $\epsilon_a$ in the permittivity tensor, the enhancement may be calculated with $\tau=\tau_0$ and $\theta_2=\pi$ illustrated by dashed line and with $\tau=\tau_0$ and $\theta_2=0$ illustrated by empty circles connected by dashed curve. As such, the spacing or distance $d_0$ of the central gap 115 may reduce due to enlarging $\epsilon_a$ since increasing T causes negligible changes in the enhancement and when $\theta_2=0$ the optimal spacing or distance $d_0$ of the central gap 115 does not decrease.

As such, it should now be understood that a peak heat transfer enhancement in the example multilayer thermal tunable system 100 may be acquired when $d_0=d_1(d)=g_1(g)$ with a large $\epsilon_a$ and substantially reducing peak enhancement magnitude.

Figure 8:
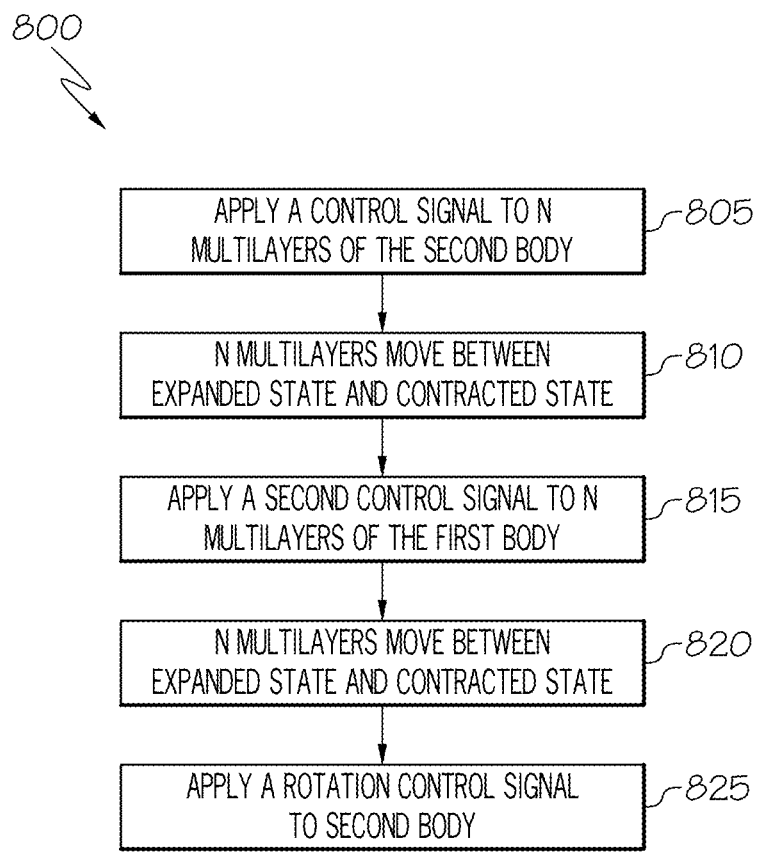
FIG. 8 schematically depicts an illustrative method for actuating the example multilayer thermal tunable system of FIG. 1 according to one or more embodiments shown and described herein.

FIG. 8 is a flow diagram that graphically depicts an illustrative method 800 for actuating the example multilayer thermal tunable system 100. Although the steps associated with the blocks of FIG. 8 will be described as being separate tasks, in other embodiments, the blocks may be combined or omitted. Further, while the steps associated with the blocks of FIG. 8 will described as being performed in a particular order, in other embodiments, the steps may be performed in a different order.

At block 805, a control signal is applied to the plurality of N multilayers of the second body via the controller. In response, at block 810, the plurality of N multilayers of the second body move or change a thickness of a dielectric positioned between each of the plurality of spaced apart semimetal layers between either a contracted state or an expanded state. That is, in the contracted state, each of the layers each of the plurality of spaced apart semimetal layers of the second body are no longer spaced apart and now abut one other to form a continuous substrate of the second body. In the expanded state, each of the plurality of spaced apart semimetal layers of the plurality of N multilayers of the second body are spaced apart from one another by a thickness of the dielectric.

At block 815, a second control signal is applied to the plurality of N multilayers of the first body via the controller. In response, at block 820, the plurality of N multilayers of the first body move or change a thickness of a dielectric positioned between each of the plurality of spaced apart semimetal layers between either a contracted state or an expanded state. That is, in the contracted state, each of the layers each of the plurality of spaced apart semimetal layers of the first body are no longer spaced apart and now abut one other to form a continuous substrate of the first body. In the expanded state, each of the plurality of spaced apart semimetal layers of the plurality of N multilayers of the second body are spaced apart from one another by a thickness of the dielectric.

At block 825, a rotation control signal is applied to the second body via the controller, which causes the second body to rotate to change optical properties of the second body used in heat transference.

It should be appreciated that the second body may be positioned a distance away from the first body and is rotated with a rotation angle $\theta_2$ between 0 to $\pi$ to change the optical property of decorated plurality of Weyl semimetal nanostructures of the second body such that a mismatch in a permittivity of the optical properties of the second body and the first body is generated. The generated mismatch increases or decreases a near-field radiative heat transfer compared to a static state of the second body.

It should be appreciated that the illustrative method 800 may continuously be executed and continuously loop such that the example bi-functional thermal cooling system is continuous increasing or decreasing the near-field radiative heat transfer.

It should now be understood that the embodiments of this disclosure described herein provide a tow body system for near-field radiative heat transfer that utilizes multilayers that are configured to move independently between contracted state and uncontracted along with rotation of a second body to tune a near-field radiative heat transfer from the first body to the second body.

It is noted that the term "about" and "generally" may be utilized herein to represent the inherent degree of uncertainty that may be attributed to any quantitative comparison, value, measurement, or other representation. This term is also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A tunable heat transfer system comprising:
   a controller;
   a first body communicatively coupled to the controller; and a second body communicatively coupled to the controller and spaced apart from the first body, the second body having a plurality of semimetal layers and a dielectric portion positioned between each of the plurality of semimetal layers, each of the dielectric portions having a thickness to define a gap between each the plurality of semimetal layers in an expanded state and permitting each of the plurality of semimetal layers to abut each other in a contracted state, wherein the controller is configured to change a near-field radiative heat transfer between the first body and the second body by changing the thickness of each of the dielectric portions between the expanded state and the contracted state.

2. The tunable heat transfer system of claim 1, wherein the plurality of semimetal layers have a same thickness and the dielectric portions positioned therebetween have the same spacing in the expanded state.

3. The tunable heat transfer system of claim 1, wherein the second body is configured to rotate with respect to the first body.

4. The tunable heat transfer system of claim 3, wherein the rotation of the second body is between 0 degrees and 180 degrees.

5. The tunable heat transfer system of claim 1, wherein the first body and the second body are positioned along a same axis.

6. The tunable heat transfer system of claim 1, wherein the first body and the second body are in an asymmetric arrangement.

7. The tunable heat transfer system of claim 1, wherein the second body further includes a substrate, in the contracted state, the plurality of semimetal layers and the substrate form a semi-infinite Weyl semimetal body without any multilayer decoration.

8. The tunable heat transfer system of claim 1, wherein the first body is configured as a heat source and the second body is configured as a heat receiver to receive a heat generated from the first body.

9. A thermal cooling system comprising:
   a controller;
   a first body communicatively coupled to the controller, the first body having a first plurality of semimetal layers and a first dielectric portion positioned between each of the first plurality of semimetal layers, each of the first dielectric portions having a thickness to define a first gap between each of the first plurality of semimetal layers; and
   a second body spaced apart from the first body, the second body communicatively coupled to the controller, the second body having a second plurality of semimetal layers and a second dielectric portion positioned between each of the second plurality of semimetal layers, each of the second dielectric portions having a thickness to define a second gap between each of the second plurality of semimetal layers in an expanded state and permitting each of the second plurality of semimetal layers to abut each other in a contracted state,
   wherein the controller is configured to change a near-field radiative heat transfer between the first body and the second body by changing the thickness of each of the second dielectric portions between the expanded state and the contracted state.

10. The thermal cooling system of claim 9, wherein each of the first dielectric portions move between a different expanded state and a different contracted state.

11. The thermal cooling system of claim 10, wherein the near-field radiative heat transfer between the first body and the second body is modified by changing the thickness of each of the dielectric portions between the expanded state and the contracted state.

12. The thermal cooling system of claim 10, wherein the first plurality of semimetal layers have a same thickness and the first dielectric portions positioned therebetween have the same spacing in the different expanded state and the second plurality of semimetal layers have a same thickness and the dielectric portions positioned therebetween have the same spacing in the expanded state.

13. The thermal cooling system of claim 10, wherein the second body is configured to rotate with respect to the first body.

14. The thermal cooling system of claim 13, wherein the rotation of the second body is between 0 degrees and 180 degrees.

15. The thermal cooling system of claim 10, wherein the first body and the second body are positioned along a same axis.

16. A method for forming a tunable heat transfer system, the method comprising:
   applying a control signal to a body via a controller, to move a plurality of semimetal layers of the body to change a thickness of a dielectric portion positioned between each of the plurality of semimetal layers to move between a contracted state and an expanded state; and
   rotating the body, wherein the rotation of the body changes optical properties of the body compared to an unrotated object,
   wherein the moving of the dielectric portions of the body between the contracted state and the expanded state move the plurality of semimetal layers to change a near-field radiative heat transfer by changing the thickness of the dielectric portions positioned between each of the plurality of semimetal layers thereby changing gaps between the plurality of semimetal layers.

17. The method of claim 16, further comprising:
   applying a different control signal to an another body via the controller, to move a second plurality of semimetal layers of the another body to change a thickness of a second dielectric portion positioned between each of the second plurality of semimetal layers between either a different contracted state or a different expanded state.

18. The method of claim 17, wherein the moving of the second plurality of semimetal layers of the another body changes the near-field radiative heat transfer by changing the thickness of the second dielectric portions thereby changing gaps between the second plurality of semimetal layers.

19. The method of claim 18, wherein the plurality of semimetal layers have a same thickness and the dielectric portions positioned between each of the plurality of semimetal layers positioned therebetween have the same spacing in the expanded state.

20. The method of claim 17, wherein the second plurality of semimetal layers have a same thickness and the second dielectric portions positioned therebetween have the same spacing in the expanded state.

* * * * *

UNITED STATES PATENT AND TRADEMARK OFFICE
CERTIFICATE OF CORRECTION

PATENT NO. : 12,228,353 B2  
APPLICATION NO. : 18/104607  
DATED : February 18, 2025  
INVENTOR(S) : Ziqi Yu et al.

Page 1 of 1

It is certified that error appears in the above-identified patent and that said Letters Patent is hereby corrected as shown below:

On the Title Page

Item (73) assignee 2, city, delete "Toyota (JP)" and insert --Toyota-shi Aichi-ken (JP)--, therefor.

Item (57), abstract, Line(s) 1, after "relate", insert --to--.

Item (57), abstract, Line(s) 10, after "each", insert --of--.

In the Specification

In Column 1, Line(s) 49, after "each", insert --of--.

In Column 2, Line(s) 21, delete "move" and insert --moves--, therefor.

In Column 14, Line(s) 25, delete "$\overline{T} = D_0^{-1} \Pi_{n=1}^{N-1} (D_n P_n D_n^{-1}) D_n$" and insert --$\tilde{T} = D_0^{-1} \Pi_{n=1}^{N-1} (D_n P_n D_n^{-1}) D_n$--, therefor.

In Column 16, Line(s) 52, delete "may by varying" and insert --may be varied by varying--, therefor.

In Column 18, Line(s) 19, delete "pf" and insert --of--, therefor.

In Column 19, Line(s) 57, after "will", insert --be--.

In Column 20, Line(s) 37, delete "continuous" and insert --continuously--, therefor.

Signed and Sealed this  
Twenty-second Day of April, 2025

Coke Morgan Stewart  
*Acting Director of the United States Patent and Trademark Office*